(12) United States Patent
Hagihara

(10) Patent No.: US 10,728,894 B2
(45) Date of Patent: Jul. 28, 2020

(54) COMMUNICATION TERMINAL AND WIRELESS COMMUNICATION SYSTEM FOR RELAYING DATA COMMUNICATIONS

(71) Applicant: TLV CO., LTD., Hyogo (JP)

(72) Inventor: Kazunari Hagihara, Kakogawa (JP)

(73) Assignee: TLV CO., LTD., Hyogo (JP)

(*) Notice: Subject to any disclaimer, the term of this patent is extended or adjusted under 35 U.S.C. 154(b) by 83 days.

(21) Appl. No.: 15/895,364

(22) Filed: Feb. 13, 2018

(65) Prior Publication Data
US 2018/0176914 A1 Jun. 21, 2018

Related U.S. Application Data

(63) Continuation of application No. PCT/JP2016/074156, filed on Aug. 18, 2016.

(30) Foreign Application Priority Data

Aug. 18, 2015 (JP) ................................. 2015-161460

(51) Int. Cl.
*H04W 72/04* (2009.01)
*H04L 12/44* (2006.01)
(Continued)

(52) U.S. Cl.
CPC .......... *H04W 72/0446* (2013.01); *H04B 7/14* (2013.01); *H04L 12/44* (2013.01);
(Continued)

(58) Field of Classification Search
CPC ......... H04W 72/0446; H04W 52/0216; H04W 88/04; H04W 84/18; H04W 52/0229;
(Continued)

(56) References Cited

U.S. PATENT DOCUMENTS

2003/0103479 A1* 6/2003 Anderson ......... H04W 52/0216
370/335
2012/0063389 A1 3/2012 Abedi
(Continued)

FOREIGN PATENT DOCUMENTS

JP 2009-094896 A 4/2009
JP 2011-009828 A 1/2011

OTHER PUBLICATIONS

An Office Action issued by the European Patent Office dated Feb. 13, 2019, which corresponds to EP16837164.9-1219 and is related to U.S. Appl. No. 15/895,364.
(Continued)

*Primary Examiner* — Justin T Van Roie
(74) *Attorney, Agent, or Firm* — Studebaker & Brackett PC

(57) ABSTRACT

A communication relay device is assigned with a specific slot in a communication schedule divided into a plurality of time slots. The communication relay device includes: a communication controller that switches a state between an active state and a sleep state and performs communication in the active state; and a slot determiner that determines arrival of a specific slot and arrival of a relay slot that is a time slot assigned to another lower-layer communication relay device. The communication controller changes to the active state and performs a predetermined communication process if the slot determiner determines arrival of the specific slot, and changes to the active state and performs a relay process if the slot determiner determines arrival of the relay slot.

1 Claim, 24 Drawing Sheets

(51) Int. Cl.
*H04W 52/02* (2009.01)
*H04B 7/14* (2006.01)
*H04W 84/18* (2009.01)
*H04W 88/04* (2009.01)
*H04W 84/20* (2009.01)
*H04W 88/02* (2009.01)
*H04W 88/16* (2009.01)

(52) U.S. Cl.
CPC .... *H04W 52/0216* (2013.01); *H04W 52/0229* (2013.01); *H04W 84/18* (2013.01); *H04W 84/20* (2013.01); *H04W 88/02* (2013.01); *H04W 88/04* (2013.01); *H04W 88/16* (2013.01); *Y02D 70/00* (2018.01)

(58) Field of Classification Search
CPC ..... H04W 88/16; H04W 88/02; H04W 84/20; H04B 7/14; H04L 12/44; Y02D 70/00
See application file for complete search history.

(56) References Cited

U.S. PATENT DOCUMENTS

2014/0169340 A1* 6/2014 Gupta .................... H04W 4/70
370/336
2015/0264628 A1* 9/2015 Wen ...................... H04W 40/22
370/315

OTHER PUBLICATIONS

International Search Report issued in PCT/JP2016/074156; dated Nov. 1, 2016.
The extended European search report issued by the European Patent Office dated Jul. 2, 2018, which corresponds to European Patent Application No. 16837164.9-1219 and is related to U.S. Appl. No. 15/895,364.

* cited by examiner

T: steam trap
G: pressure reducing valve
V: valve

FIG. 8

TIME SLOT SET TIME INFORMATION

| SLOT NUMBER | START TIME | END TIME |
|---|---|---|
| 1 | 0 | 30 |
| 2 | 30 | 60 |
| 3 | 60 | 90 |
| 4 | 90 | 120 |
| 5 | 120 | 150 |
| 6 | 150 | 180 |
| 7 | 180 | 210 |
| ~ | ~ | ~ |
| 119 | 3540 | 3570 |
| 120 | 3570 | 3600 |

FIG. 9

TIME SLOT ASSIGNMENT INFORMATION

| SLOT NUMBER | PROCESS SYSTEM CONSTITUENT DEVICE ID |
|---|---|
| 1 | 0 |
| 2 | R1 |
| 3 | R2 |
| 4 | R3 |
| 5 | R4 |
| 6 | R5 |

FIG. 10

NETWORK ARCHITECTURE INFORMATION

| LOWER-LAYER PROCESS SYSTEM CONSTITUENT DEVICE ID | HIGHER-LAYER PROCESS SYSTEM CONSTITUENT DEVICE ID |
|---|---|
| R1 | TRAP OPERATION STATUS MANAGEMENT DEVICE |
| R2 | R1 |
| R3 | R1 |
| R4 | R3 |
| R5 | TRAP OPERATION STATUS MANAGEMENT DEVICE |

100: management system
110: provider device
120: management device
130: communication relay device

FIG. 12

OPERATION STATUS RELAY TIME INFORMATION

| PROCESS SYSTEM CONSTITUENT DEVICE ID | START TIME | END TIME |
|---|---|---|
| T4 | 0 | 0.5 |
| T5 | 0.5 | 1 |
| T6 | 1 | 1.5 |

FIG. 13

OPERATION STATUS INFORMATION

| OPERATION STATUS TYPE INFORMATION | OPERATION STATUS VALUE | OPERATION STATUS VALUE ACQUISITION TIME POINT |
|---|---|---|
| TEMPERATURE | 98.00°C | 2015/07/15 00:01:32 |
| VIBRATION | 40kHz | 2015/07/15 00:01:32 |

FIG. 14

OPERATION STATUS INFORMATION DB

| PROCESS SYSTEM CONSTITUENT DEVICE ID | OPERATION STATUS TYPE INFORMATION | OPERATION STATUS VALUE | OPERATION STATUS VALUE ACQUISITION TIME POINT | RECEPTION TIME POINT |
|---|---|---|---|---|
| T1 | TEMPERATURE | 98.01°C | 2015/07/15 00:00:02 | 2015/07/15 00:00:15 |
| T1 | VIBRATION | 38kHz | 2015/07/15 00:00:02 | 2015/07/15 00:00:15 |
| ~ | ~ | ~ | ~ | ~ |
| T5 | TEMPERATURE | 98.00°C | 2015/07/15 00:01:32 | 2015/07/15 00:01:45 |
| T5 | VIBRATION | 40kHz | 2015/07/15 00:01:32 | 2015/07/15 00:01:45 |

FIG. 17

TIME SLOT ASSIGNMENT INFORMATION

| SLOT NUMBER | PROCESS SYSTEM CONSTITUENT DEVICE ID |
|---|---|
| 1 | 0 |
| 2 | R1 |
| 3 | R2 |
| 4 | R3 |
| 5 | R4 |
| 6 | R5 |
| 119 | R100 |

FIG. 18

NETWORK ARCHITECTURE INFORMATION

| LOWER-LAYER PROCESS SYSTEM CONSTITUENT DEVICE ID | HIGHER-LAYER PROCESS SYSTEM CONSTITUENT DEVICE ID |
|---|---|
| R1 | TRAP OPERATION STATUS MANAGEMENT DEVICE |
| R2 | R1 |
| R3 | R1 |
| R4 | R3 |
| R5 | TRAP OPERATION STATUS MANAGEMENT DEVICE |
| ... | ... |
| R100 | R3 |
| | |

NETWORK ARCHITECTURE INFORMATION

| LOWER-LAYER PROCESS SYSTEM CONSTITUENT DEVICE ID | HIGHER-LAYER PROCESS SYSTEM CONSTITUENT DEVICE ID |
|---|---|
| R1 | TRAP OPERATION STATUS MANAGEMENT DEVICE |
| R2 | R1 |
| R4 | R2 |
| R5 | TRAP OPERATION STATUS MANAGEMENT DEVICE |

OPERATION STATUS RELAY TIME INFORMATION

| PROCESS SYSTEM CONSTITUENT DEVICE ID | START TIME | END TIME |
|---|---|---|
| T4 | 0 | 0.5 |
| T5 | 0.5 | 1.0 |
| T6 | 1.0 | 1.5 |
| T10 | 1.5 | 2.0 |

FIG. 27          PRIOR ART

| SENSOR NODE IDENTIFIER | HOP COUNT | CHILD NODE COUNT |
|---|---|---|
| 4-1-1 | 1 | 7 |
| 4-2-1 | 2 | 4 |
| 4-3-1 | 3 | 2 |
| 4-4-1 | 4 | 0 |
| 4-4-2 | 4 | 0 |
| 4-3-2 | 3 | 0 |
| 4-2-2 | 2 | 1 |
| 4-3-3 | 3 | 0 |
| 4-1-2 | 1 | 1 |
| 4-2-3 | 2 | 0 |

FIG. 28

NETWORK ARCHITECTURE INFORMATION

| LOWER-LAYER DEVICE ID | R1 | R2 | R3 | R4 | R5 |
|---|---|---|---|---|---|
| HIGHER-LAYER DEVICE ID | 120 | R1 | R1 | R3 | 120 |

FIG. 29

ROUTING TABLE

| FINAL | R1 | R2 | R3 | R4 | R5 |
|---|---|---|---|---|---|
| ONE-HOP PRECEDING | – | R2 | R3 | R3 | – |

FIG. 30

SENSOR TABLE

| PROVIDER DEVICE | T1 | T2 | T3 | T4 | T5 | T6 | T7 | T8 |
|---|---|---|---|---|---|---|---|---|
| COMMUNICATION RELAY DEVICE | R2 | R2 | R2 | R4 | R4 | R4 | R5 | R5 |

| T9 | T10 | T11 | T12 | T13 | T14 |
|---|---|---|---|---|---|
| R5 | R3 | R3 | R1 | R1 | R1 |

FIG. 31

COMMUNICATION SCHEDULE

|  | L0 | L1 | L2 | L3 | L4 | ... | Ln |
|---|---|---|---|---|---|---|---|
| N1 | 120 | R1 | R2 | R4 |  |  |  |
| N2 | 120 | R5 | R3 |  |  |  |  |
| N3 | 120 |  |  |  |  |  |  |
| N4 | 120 |  |  |  |  |  |  |
| ⋮ |  |  |  |  |  |  |  |
| Nm | 120 |  |  |  |  |  |  |

FIG. 32

UPDATED NETWORK ARCHITECTURE INFORMATION

| LOWER-LAYER DEVICE ID | R1 | R2 | R3 | R4 | R5 | R100 |
|---|---|---|---|---|---|---|
| HIGHER-LAYER DEVICE ID | 120 | R1 | R1 | R3 | 120 | R3 |

FIG. 33

UPDATED ROUTING TABLE

| FINAL | R1 | R2 | R3 | R4 | R5 | R100 |
|---|---|---|---|---|---|---|
| ONE-HOP PRECEDING | – | R2 | R3 | R3 | – | R3 |

FIG. 34

UPDATED COMMUNICATION SCHEDULE

|  | L0 | L1 | L2 | L3 | L4 | ... | Ln |
|---|---|---|---|---|---|---|---|
| N1 | 120 | R1 | R2 | R4 |  |  |  |
| N2 | 120 | R5 | R3 | R100 |  |  |  |
| N3 | 120 |  |  |  |  |  |  |
| N4 | 120 |  |  |  |  |  |  |
| ⋮ |  |  |  |  |  |  |  |
| Nm | 120 |  |  |  |  |  |  |

COMMUNICATION TERMINAL AND WIRELESS COMMUNICATION SYSTEM FOR RELAYING DATA COMMUNICATIONS

CROSS-REFERENCE TO RELATED APPLICATION

This is a continuation of PCT International Application PCT/JP2016/074156 filed on Aug. 18, 2016, which claims priority to Japanese Patent Application No. 2015-161460 filed on Aug. 18, 2015. The disclosures of these applications including the specifications, the drawings, and the claims are hereby incorporated by reference in their entirety.

FIELD

The technique disclosed here relates to a communication terminal and a wireless communication system.

BACKGROUND

A typical wireless communication system (see, for example, Japanese Patent Application Publication No. 2011-9828) will be described with reference to FIGS. 26 and 27. An application node communicates with each of a plurality of sensor nodes through a gateway device 1. Some of the sensor nodes are relayed by other sensor nodes to communicate with the application node.

The gateway device 1 sequentially sets packet transmission times in the descending order of a hop count or a child node count of each sensor node. The gateway device 1 includes information defining the hop count and the child node count of each sensor node as illustrated in FIG. 27. In general, as the hop count or the child node count increases, packet collision more frequently occurs. This gateway device, however, sets packet transmission times while placing priority to nodes with large hop counts or child node counts, and thus, packet collision is less likely to occur. Consequently, packets do not need to be sent again, and thus, the difference between an intended packet acquisition time point and an actual packet acquisition time point in an application node decreases. Accordingly, the application node can acquire data at an intended time.

The gateway device 1 sets a packet transmission time by using a network architecture table listing hop counts and child node counts (see FIG. 27). In a case where the network architecture is changed, hop counts and child node counts of sensor nodes in the entire network are calculated again, and the network architecture table is updated.

SUMMARY

Technical Problem

When the network architecture is changed as described above, relay routes of packets and packet transmission times are changed. Accordingly, a sensor node that is to perform a relay process can be changed, and/or the time of the relay process of the sensor node can be changed in some cases. For this reason, in a system as described above, each sensor node needs to perform a relay process flexibly in accordance with a change of the network architecture.

The technique disclosed here has been made in view of the foregoing circumstances, and has an object of easily performing a relay process even with a change of a network architecture.

Solution to Problem

The technique disclosed here is directed to a communication terminal constituting a communication network together with other communication terminals and is assigned with a specific time slot in a communication schedule divided into a plurality of time slots. The communication terminal includes: a communication controller that switches a state between an active state and a sleep state with a smaller power consumption than that in the active state and communicates with at least another communication terminal in the active state; and a slot determiner that determines arrival of the specific time slot and arrival of a relay time slot, the relay time slot being a time slot assigned to another lower-layer communication terminal, wherein the communication controller changes to the active state and performs a predetermined communication process if the slot determiner determines arrival of the specific time slot, and changes to the active state and performs a communication relay process between the lower-layer communication terminal and another higher-layer communication terminal if the slot determiner determines arrival of the relay time slot.

The technique disclosed here is directed to a wireless communication system forming a communication network using a plurality of communication terminals. The plurality of communication terminals include a master unit and a plurality of slave units connected to the master unit and constituting the communication network, the master unit and the plurality of slave units communicate with each other according to a communication schedule divided into a plurality of time slots, each of the plurality of slave units is assigned with a specific time slot in the plurality of time slots, the master unit communicates with a corresponding one of the slave units in the specific time slot, according to the communication schedule, each of the slave units includes a communication controller that switches a state between an active state and a sleep state with a smaller power consumption than that in the active state and communicates with at least the master unit or another slave unit in the active state, and a slot determiner that determines arrival of the specific time slot and arrival of a relay time slot, the relay time slot being a time slot assigned to another lower-layer slave unit, and the communication controller changes to the active state and performs a predetermined communication process if the slot determiner determines arrival of the specific time slot, and changes to the active state and performs a communication relay process between the lower-layer slave unit and another higher-layer slave unit if the slot determiner determines arrival of the relay time slot.

Advantages of Invention

With the communication terminal, even with a change of a network architecture, a relay process can be easily achieved.

With the wireless communication system, even with a change of a network architecture, a relay process can be easily achieved.

BRIEF DESCRIPTION OF THE DRAWINGS

FIG. 8 is a table showing a data structure of time slot set time information.

FIG. 9 is a table showing a data structure of time slot assignment information.

FIG. 10 is a table showing data structure of network architecture information.

FIG. 12 is a table showing a data structure of operation status relay time information.

FIG. 13 is a table showing a data structure of operation status information.

FIG. 14 is a table showing a data structure of an operation status information database.

FIG. 17 is a table showing a data structure of time slot assignment information after change.

FIG. 18 is a table showing a data structure of network architecture information after change.

FIG. 27 is a table showing information defining hop counts and child node counts of individual node sensors of the typical communication relay device.

FIG. 28 is a table showing network architecture information associated with the system illustrated in FIG. 1.

FIG. 29 is a table showing a routing table of a communication relay device with a device ID "R1" in the system of FIG. 1.

FIG. 30 is a table showing a sensor table associated with the system illustrated in FIG. 1.

FIG. 31 is a table showing a communication schedule.

FIG. 32 is a table showing updated network architecture information.

FIG. 33 is an updated routing table of a communication relay device with the device ID "R1".

FIG. 34 is a table showing an updated communication schedule.

DESCRIPTION OF EMBODIMENTS

Embodiments

An embodiment will be hereinafter described in detail with reference to the drawings. Description will be given on a trap operation status management system that includes communication relay devices 130 as an embodiment of communication relay devices, and provides operation statuses of steam traps for use in a steam system.

I. Hardware Configuration of Trap Operation Status Management System 100

Figure 1:
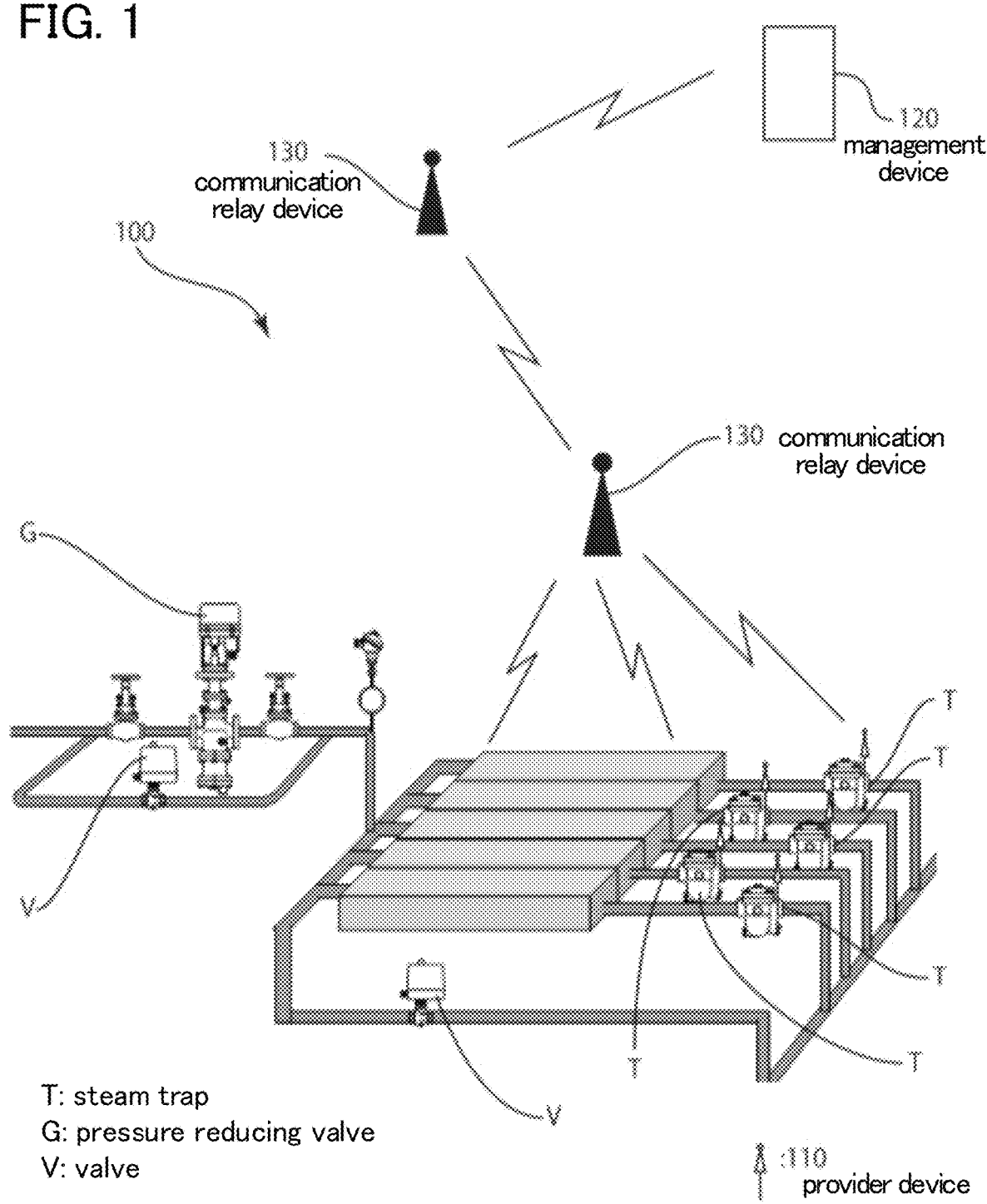
FIG. 1 is a view illustrating a configuration of a trap operation status management system.

A trap operation status management system (hereinafter referred to as a "management system") 100 will be described with reference to FIG. 1. The management system 100 is a system that manages operation statuses of a large number of steam traps T distributed in a process system formed in, for example, a factory or a plant through wireless communication. The management system 100 includes trap operation status provider devices (hereinafter referred to as "provider devices") 110, a trap operation status management device (hereinafter referred to as a "management device") 120, and communication relay devices 130. The management device 120, the communication relay devices 130, and the provider devices 110 are communication terminals, wirelessly communicate with one another, and autonomously constitute a network. In the management system 100, a multihop wireless network is formed. The management system 100 is an example of a wireless communication system.

The management device 120 functions as a master unit, and the communication relay devices 130 function as slave units. Basically, the management device 120 communicates with the communication relay devices 130, and the provider devices 110 communicate with the communication relay devices 130. The number of the provider devices 110 is larger than the number of the communication relay devices 130. The management device 120 and the communication relay devices 130 have a tree network topology in which the management device 120 is at a vertex (highest-layer). In this specification, the management device 120 is defined as being at an upstream side or a higher-layer in the network, and the bottom side of the tree is defined as a downstream side or a lower level.

The management device 120 establishes a communication path of the management system 100 and collects and manages operation status information of the provider devices 110. For example, the management device 120 acquires operation status information from the provider devices 110 through the communication relay devices 130 to thereby manage an operation status of each steam trap T and determine an operation status. The management device 120 can be connected to a higher-level server through an external network, for example. The management device 120 transfers detection values of the provider devices 110 to the server as necessary.

The provider devices 110 are disposed in the steam traps T constituting the process system. The provider devices 110 acquire operation statuses of the steam traps T, and at an operation status relay time previously determined for each provider device 110, transmit the acquired operation statuses to the communication relay devices 130. The provider devices 110 are in a so-called sleep state in a time except for a time in which the provider devices 110 acquire operation statuses of the steam traps T and transmit the statuses to the communication relay devices 130.

The communication relay devices 130 constitute a communication network of the management system 100. The communication relay devices 130 communicate with the management devices 110 according to a communication schedule including a plurality of time slots that are communication time frames obtained by dividing the communication schedule into predetermined lengths of time. Each of the communication relay devices 130 is assigned with a specific time slot.

Each of the communication relay devices 130 temporarily stores operation status information acquired from one of the provider devices 110 directly communicating with this communication relay device 130, and then transmits the operation status information to the management device 120, in its time slot. This process corresponds to a predetermined communication process. Basically, each of the communication relay devices 130 is in an active state in its time slot and is otherwise in the so-called sleep state.

It should be noted that each of the communication relay devices 130 is also in the active state in time slots of another lower-layer communication relay device 130, and relays communication from the lower-layer communication relay device 130 to another higher-layer communication relay device 130. This process corresponds to a relay process. Each of the communication relay devices 130 determines whether a current time slot is a time slot of another lower-layer communication relay device 130 in the communication network, and if the current time slot is a time slot of the lower-layer communication relay device 130, performs the communication relay process, and if the current time slot is neither a time slot of another lower-layer communication relay device 130 nor a time slot of itself, changes to the sleep state.

In this manner, each communication relay device 130 can establish communication with another lower-layer communication relay device 130 only by determining whether a current time slot is a time slot of the lower-layer communication relay device 130 or not. Accordingly, even when the architecture of the communication network changes, the communication relay process can be easily performed. In addition, the communication relay devices 130 temporarily store and hold operation status information, and thus, a synchronous process is needed only between the communication relay devices 130 and the provider devices 110, and no synchronous process is needed for the entire communication network of the management system 100. Thus, traffic can be reduced as the entire communication network of the management system 100.

II. Configuration of Provider Device 110
1. Appearance of Provider Device 110

Figure 2:
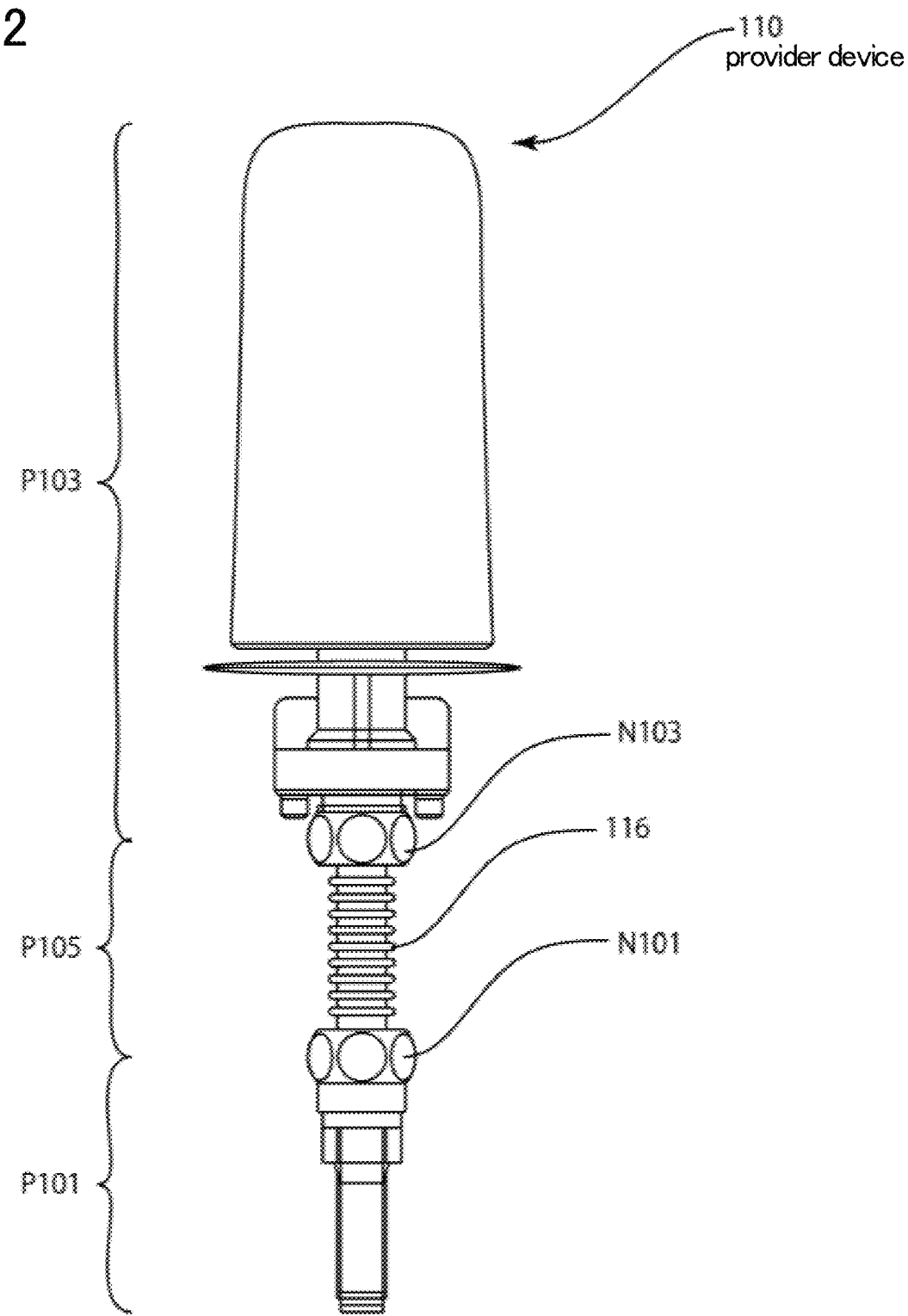
FIG. 2 is a view illustrating an appearance of a provider device.

An appearance of each provider device 110 will be described with reference to FIG.
2. Each provider device 110 includes a sensor part P101, an electric component arrangement part P103, and an intermediate shaft part P105.

The sensor part P101 detects, as an electrical signal, an operation status of the steam trap T using various sensors. The sensor part P101 includes various sensors for detecting an operation status of the stream trap T, such as a vibration sensor and a temperature sensor for detecting vibrations and a temperature. A specific configuration of the sensor part P101 is not described.

The electric component arrangement part P103 includes various circuits typified by a wireless communication circuit 110h that amplifies the electrical signal concerning the operation status detected by the sensor part P101 and supplies the electrical signal as operation status information to other communication equipment. Hardware configurations of the provider devices 110 disposed in the electric component arrangement part P103 will be described later.

The intermediate shaft part P105 includes a tubular flexible pipe 116 and a cable (not shown) disposed inside the flexible pipe 116. The cable disposed inside the flexible pipe 116 electrically connects electric components included in the electric component arrangement part P103 to the sensors included in the sensor part P101. The flexible pipe 116 of the intermediate shaft part P105 is connected to each of the sensor part P101 and the electric component arrangement part P103 with a lower cap nut N101 and an upper cap nut N103, respectively.

Figure 3:
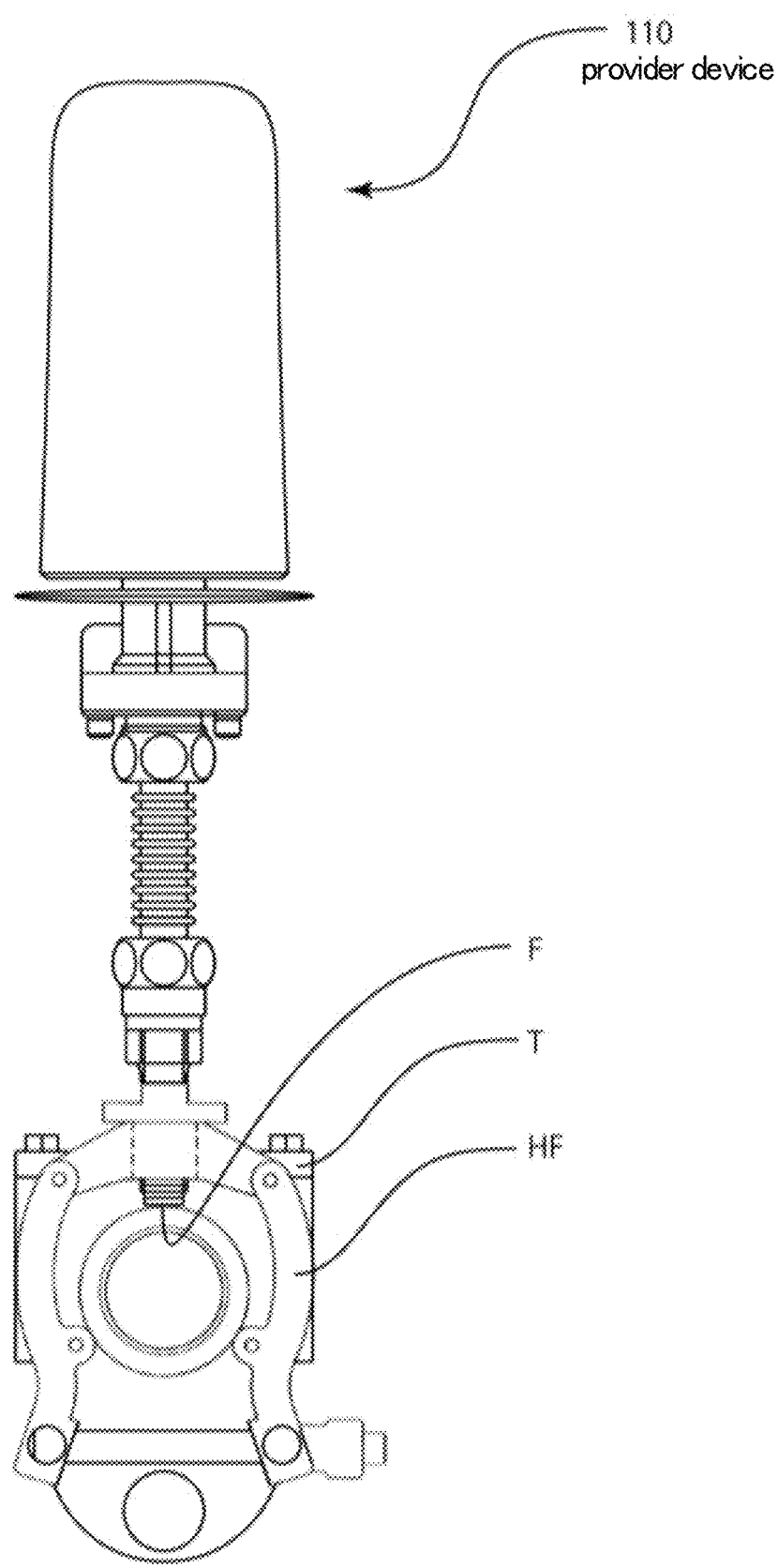
FIG. 3 is a view illustrating a state in which the provider device is attached to a steam trap.

As illustrated in FIG. 3, the provider device 110 is fixed to the steam trap T by using a predetermined holder HF. The provider device 110 is fixed to the steam trap T in such a manner that a tip F of the sensor part P101 contacts an inlet of the steam trap T, for example. In this manner, the sensors of the steam trap T acquire an operation status of the steam trap T through the tip F.

2. Hardware Configuration of Electric Components of Provider Device 110

Next, a hardware configuration of electric components disposed in the electric component arrangement part P103 of each provider device 110 illustrated in FIG. 2 will be described with reference to FIG. 4.

Figure 4:
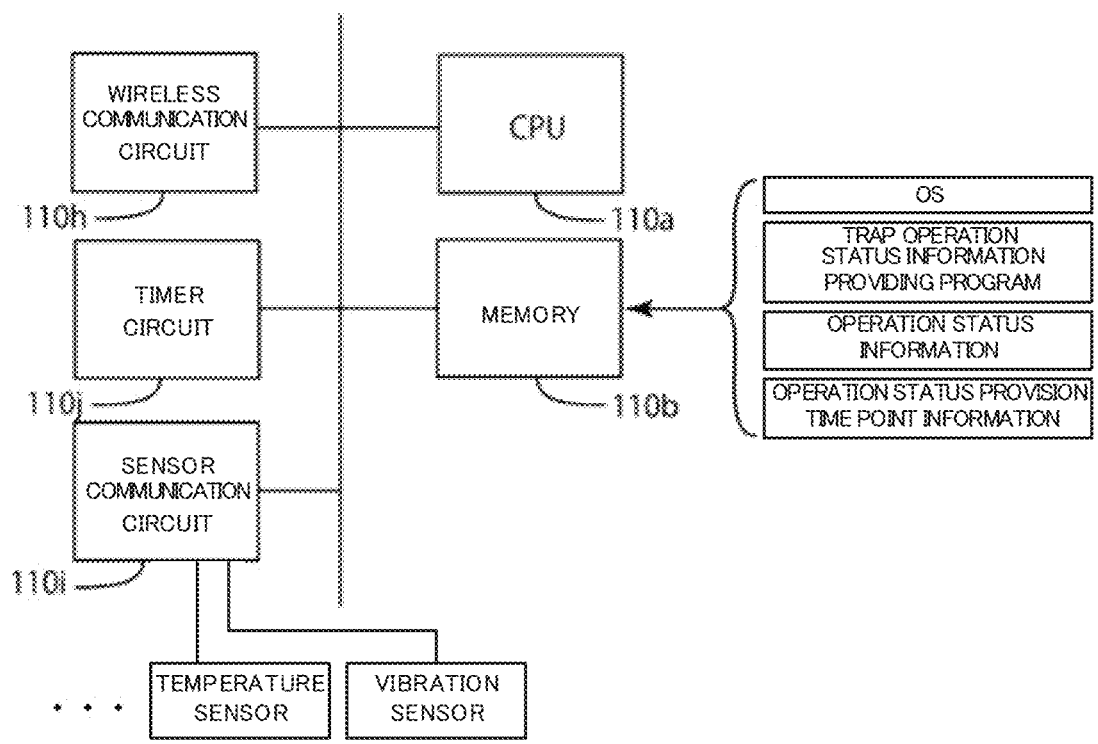
FIG. 4 is a view illustrating a hardware configuration of the provider device.

As illustrated in FIG. 4, the provider device 110 includes a CPU 110a, a memory 110b, a wireless communication circuit 110h, a sensor communication circuit 110i, and a timer circuit 110j.

The CPU 110a performs processes based on an operating system (OS), a trap operation status information provision program, and other applications recorded in the memory 110b. The memory 110b provides a work area for the CPU 110a. The memory 110b stores and holds programs of an operating system (OS), a trap operation status information provision program, and other applications, and various types of data such as operation status information and operation status provision point-of-time information. These various types of data will be described later.

The wireless communication circuit 110h transmits and receives data to and from external communication equipment such as communication relay devices 130 through wireless communication. The sensor communication circuit 110i is connected to the sensors disposed in the provider device 110 such as the temperature sensor and the vibration sensor, and acquires operation status information of the steam trap T from the sensors. The timer circuit 110j generates a predetermined clock and measures a predetermined time.

III. Hardware Configuration of Management Device 120

Figure 5:
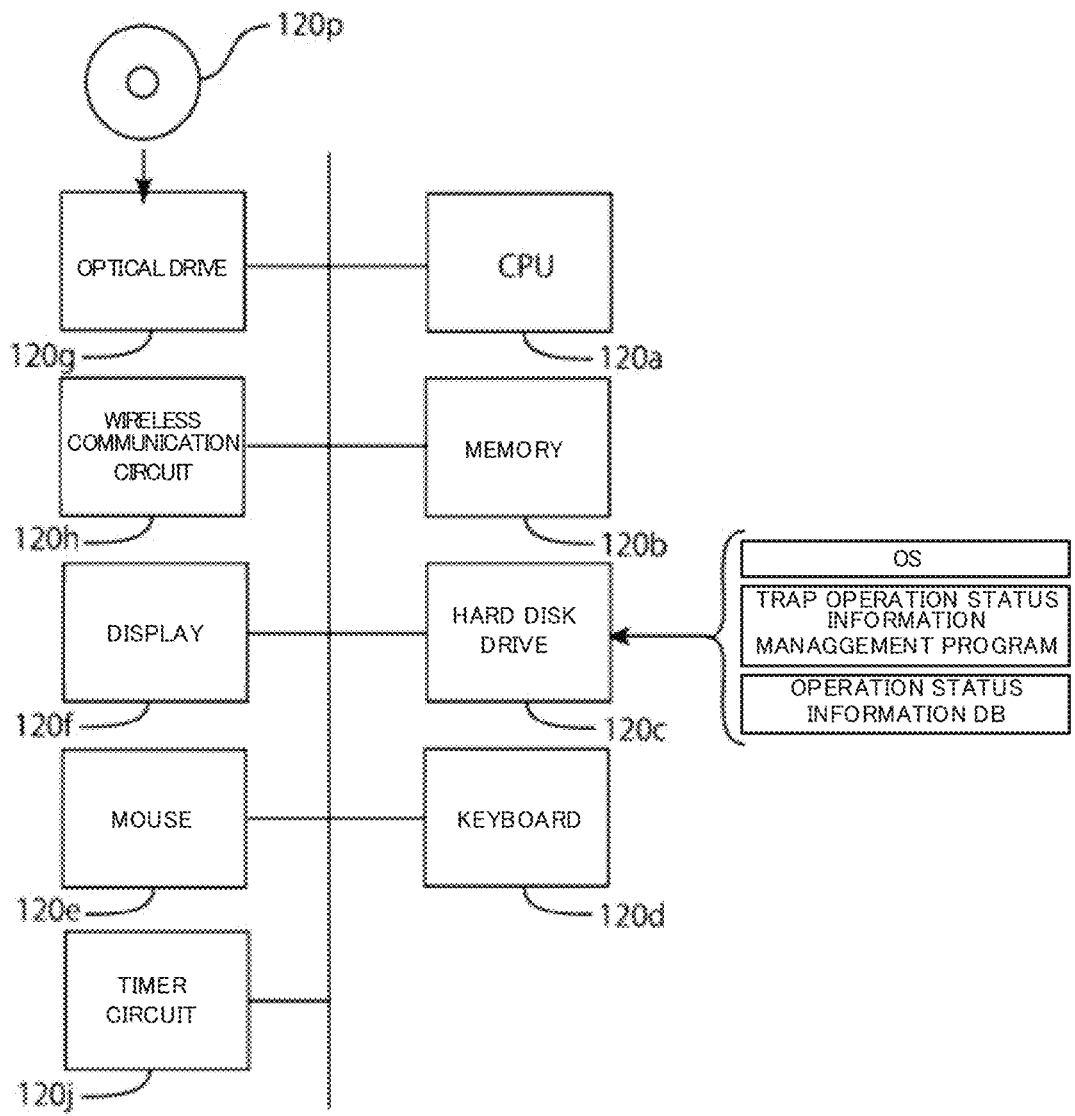
FIG. 5 illustrates a hardware configuration of a management device.

A hardware configuration of the management device 120 will be described with reference to FIG. 5. As illustrated in FIG. 5, the management device 120 includes a CPU 120a, a memory 120b, a hard disk drive 120c (hereinafter referred to as an HDD 120c), a keyboard 120d, a mouse 120e, a display 120f, an optical drive 120g, a wireless communication circuit 120h, and a timer circuit 120j.

The CPU 120a performs processes based on an operating system (OS), a trap operation status information management program, and other applications recorded on the HDD 120c. The memory 120b provides a work area for the CPU 120a. The HDD 120c stores and holds programs such as an operating system (OS), a trap operation status information management program, and other applications, and various types of data such as an operation status information database (hereinafter referred to as an operation status information DB). These various types of data will be described later.

The keyboard 120d and the mouse 120e receive an instruction from outside. The display 120f displays an image such as a user interface. The optical drive 120g reads data from the optical medium, such as reads the trap operation status information management program from an optical medium 120p (not shown) recording a trap operation status information management server program or reads a program of another application from another optical medium. The wireless communication circuit 120h transmits and receives data to and from external communication equipment such as communication relay devices 130 through wireless communication. The timer circuit 120j generates a predetermined clock, and generates a time point as a reference for the management device 120.

IV. Hardware Configuration of Communication Relay Device 130

Figure 6:
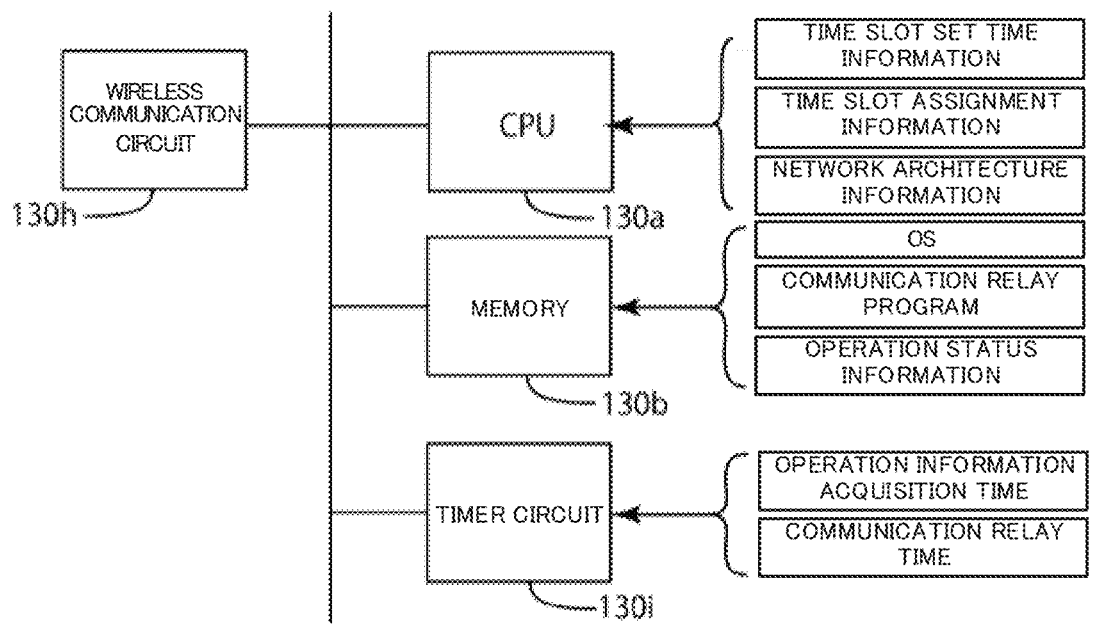
FIG. 6 is a view illustrating a hardware configuration of a communication relay device.

A hardware configuration of each relay device 130 will be described with reference to FIG. 6. The relay device 130 includes a CPU 130a, a memory 130b, a wireless communication circuit 130h, and a timer circuit 130i.

The CPU 130a performs processes based on an operating system (OS), a communication relay program, and other applications recorded in the memory 130b. The memory 130b provides a work area for the CPU 130a. The memory 130b stores and holds programs such as an operating system (OS), a communication relay program, and other applications, operation statuses acquired from the provider devices 110, and various types of data such as time slot set time information (see FIG. 8), time slot assignment information (see FIG. 9), and network architecture information (see FIG. 10). These various types of data will be described later. The wireless communication circuit 130h transmits and receives data to and from the provider devices 110, the management device 120, and other communication relay devices 130. The timer circuit 130i generates a predetermined clock and measures a predetermined time.

V. Communication Time Management in Management System 100

Communication time management used in the management system 100 will be described with reference to FIG. 7. In the management system 100, the management device 120 acquires operation statuses from the provider devices 110 through the communication relay devices 130 with a time slot system using communication management times called time slots. The time slot system is a communication time management system that manages a communication time necessary for each communication relay device 130 to communicate with other communication devices by assigning, to all the communication relay devices 130 belonging to the management system 100, time slots obtained by dividing a predetermined operation status acquisition cycle time (hereinafter also referred to as an "acquisition cycle") into predetermined lengths of time. The acquisition cycle here refers to a time interval in which an operation status is repeatedly acquired from one of the communication relay devices 130 in the management system 100.

Figure 7:
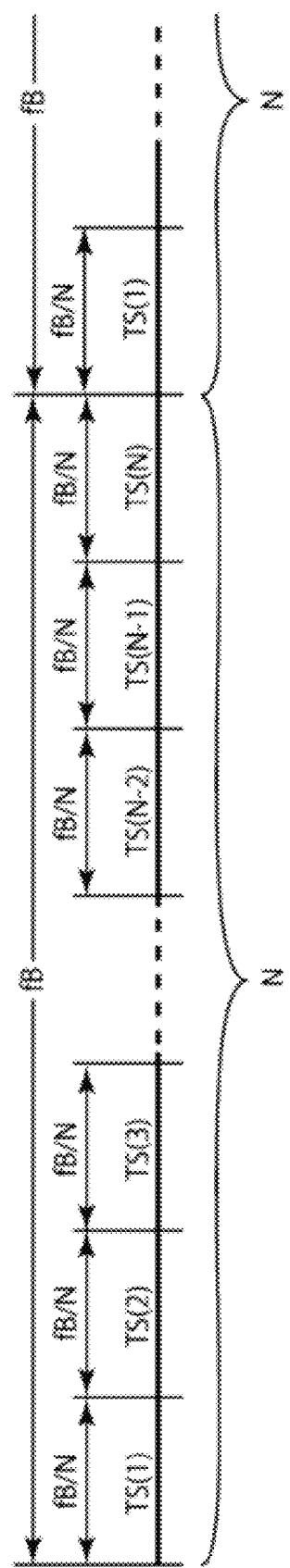
FIG. 7 is a diagram representing time slots.

As illustrated in FIG. 7, when an acquisition cycle fB is divided into a predetermined number N, the width TW of a time slot TS is fB/N. In general, N is set to be larger than the number of communication relay devices 130 belonging to the management system 100. The time slots TS are sequentially assigned with time slot numbers for specifying the individual time slots, in the order from the start of an acquisition cycle fB. In the following description, an X-th time slot TS from the start of the acquisition cycle fB is represented as a time slot TS(X).

The acquisition cycle fB is set at a time in which all the communication relay devices 130 belonging to the management system 100 can be assigned with time slots TS having the widths TW, after the widths TW of the time slots TS are set. The widths TW of the time slots TS are determined in consideration of, for example, the number of provider devices 110 belonging to (i.e., connected to) one communication relay device 130, the number of communication relay devices 130 belonging to the management system 100, and communication statuses among devices.

Start times and end times of the time slots TS are listed in time slot set time information (described later). The time slots TS are assigned with the respective communication relay devices 130. The assignment relationship between the time slots TS and the communication relay devices 130 are listed in time slot assignment information (described later).

VI. Data

Main data used in the management system 100 will be described with reference to FIGS. 8 through 14.

1. Time Slot Set Time Information

Time slot set time information (hereinafter also referred to as "slot time information") is information listing start times and end times of the time slots TS. The slot time information is provided to each of the communication relay devices 130 by the management device 120, and is stored and held in the memories 130b by the communication relay devices 130.

FIG. 8 shows a data structure of the slot time information. The slot time information includes a slot number listing region, a start time listing region, and an end time listing region. In the slot number listing region, slot numbers of time slots TS set in the management system 100 are listed. In the start time listing region, times at which the time slots TS specified by the respective slot numbers start are listed. In the end time listing region, times at which the time slots TS specified by the respective slot numbers end are listed. The times at which the time slots TS start and the times at which the time slots TS end are listed as elapsed times from the time at which an acquisition cycle fB starts.

For example, in the slot time information shown in FIG. 8, a time slot TS(3) of a slot number "3" indicates that the time slot starts "after 60 seconds" and ends "after 90 seconds" from the start of a certain acquisition cycle fB.

2. Time Slot Assignment Information

Time slot assignment information (hereinafter also referred to as "slot assignment information") is information listing the communication relay devices 130 assigned to individual time slots. The slot assignment information is provided to each of the communication relay devices 130 by the management device 120, and is stored and held in the memories 130b by the communication relay devices 130.

FIG. 9 shows a data structure of the slot assignment information. The slot assignment information includes a slot number listing region and a process system constituent device ID listing region (hereinafter also referred to as an "ID listing region"). In the slot number listing region, slot numbers set for the respective time slots TS in the management system 100 are listed. In the ID listing region, process system constituent device IDs (hereinafter referred to as "device IDs") of the communication relay devices 130 assigned to the time slots TS specified by the slot numbers are listed. For example, FIG. 9 indicates that the communication relay device 130 with a device ID "R2" is assigned to the time slot TS(3) with the slot number "3".

3. Network Architecture Information

Network architecture information is information listing a network architecture of the communication relay devices 130 belonging to the management system 100. The network architecture information is provided to each of the communication relay devices 130 by the management device 120, and is stored and held in the memories 130b by the communication relay devices 130.

FIG. 10 shows a data structure of the network architecture information. The network architecture information includes a lower-layer process system constituent device ID listing region (hereinafter also referred to as a "lower-layer ID listing region") and a higher-layer process system constituent device ID listing region (hereinafter also referred to as a "higher-layer ID listing region"). In the lower-layer ID listing region, device IDs of communication relay devices 130 belonging to the network of the management system 100 are listed. In the higher-layer ID listing region, device IDs of communication relay devices 130 located directly at higher-layers with respect to the individual communication relay devices 130 with the device IDs listed in the lower-layer ID listing region are listed.

Here, network architecture information will be described using a network architecture of the management system 100 illustrated in FIG. 11 as an example. In the network architecture illustrated in FIG. 11, the device IDs specifying the devices are shown inside the devices.

Figure 11:
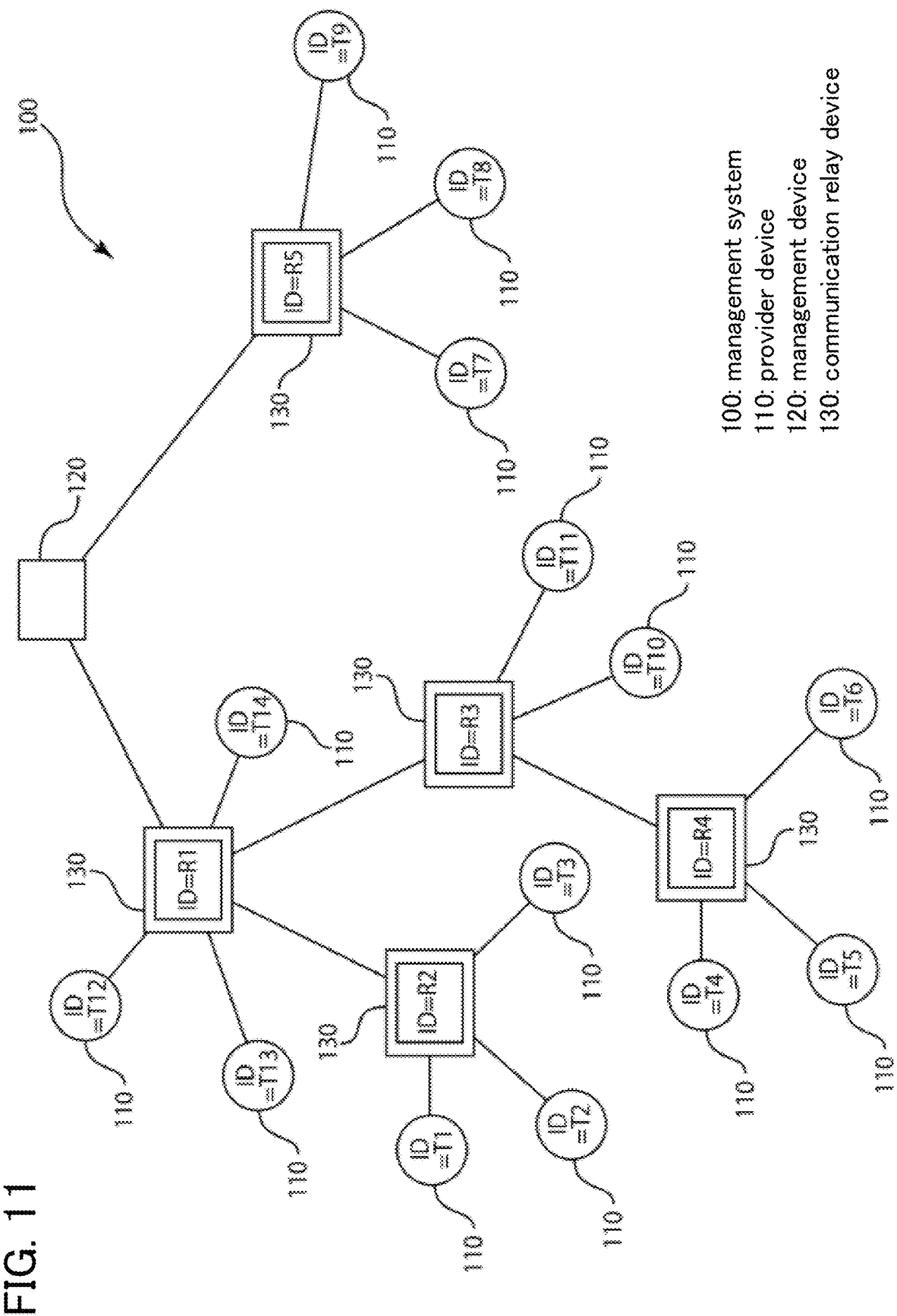
FIG. 11 is a diagram illustrating an example network architecture.

In the network architecture of the management system 100 illustrated in FIG. 11, the communication relay device 130 with a device ID "R4" is directly at a lower-layer with respect to the communication relay device 130 with the device ID "R3". That is, the communication relay device 130 with the device ID "R3" is present directly at a higher-layer with respect to the communication relay device 130 with the device ID "R4". Thus, as in the network architecture information shown in FIG. 10, "R3" is listed in a higher-layer ID listing region in correspondence with "R4" in the lower-layer ID listing region.

4. Operation Status Relay Time Information

Operation status relay time information (hereinafter also referred to as "operation status time information") is information indicating a time to be used by each of the provider devices 110 to provide an operation status to one of the communication relay devices 130. The operation status relay time point information is stored and held in the memories 130b of the communication relay devices 130.

FIG. 12 shows a data structure of the operation status time information. The operation status time information includes an ID listing region, a start time listing region, and an end time listing region. In the ID listing region, device IDs set for the provider devices 110 directly at lower-layers with respect to communication relay devices 130 are listed. In the start time listing region, times at which communication with the provider devices 110 specified by the device IDs start are listed. In the end time listing region, times at which communication with the provider devices 110 specified by the device IDs end are listed. The times at which communication with the provider devices 110 start and the times at which communication with the provider devices 110 end are listed as elapsed times from starts of time slots TS of communication relay devices 130 with which the provider devices 110 communicate, that is, communication relay devices 130 located directly at higher-layers with respect to the provider devices 110.

For example, the operation status time information shown in FIG. 12 indicates that the provider device 110 with a device ID "T5" starts after "0.5 seconds" and ends "after one second" from the start of a time slot TS(R4) of its directly higher-layer communication relay device 130 with the device ID "R4" (see FIG. 11).

5. Operation Status Information

Operation status information is information indicating operation statuses of steam traps T, such as temperature and vibrations, at a predetermined time point. The operation status information is acquired by the provider devices 110 through the various sensors, and is stored and held by the memories 110b.

FIG. 13 shows a data structure of the operation status information. The operation status information includes an operation status type information listing region (hereinafter also referred to as a "type listing region"), an operation status value listing region (hereinafter also referred to as a "status value listing region"), and an operation status value acquisition time point listing region (hereinafter also referred to as an "acquisition time point listing region"). In the type information listing region, the types of operation statuses are listed. In the status value listing region, sensor values of sensors that have acquired the operation statuses are listed. In the acquisition time point listing region, time points indicated by the timer circuits 110j when operation status values are acquired, that is, measurement time points of the sensors, are listed.

6. Operation Status Information DB

Operation status information DB is information as accumulation of operation statuses of steam traps T belonging to the network. The operation status information DB is generated by the management device 120 based on an operation status of the steam trap T acquired through each of the provider devices 110, and is stored and held by the HDD 120c.

FIG. 14 shows a data structure of the operation status information DB. The operation status information DB includes an ID listing region, an operation status type information listing region (hereinafter also referred to as a "type listing region"), an operation status value listing region (hereinafter also referred to as a "status value listing region"), an operation status value acquisition time point listing region (hereinafter also referred to as an "acquisition time point listing region"), and a reception time point listing region. In the ID listing region, device IDs specifying process system constituent devices whose operation status information has been acquired are listed. In the type information listing region, the status value listing region, and the acquisition time point listing region, values of the type information listing region, the status value listing region, and the acquisition time point listing region, respectively, of the acquired operation status information (see FIG. 13) are listed. In the reception time point listing region, time points indicated by the timer circuits 120j when the operation status information was received are listed.

VII. Operation of Management System 100

1. Operation of Communication Relay Device 130

(1) Operation Time Setting Process

With respect to each of the communication relay devices 130, in a case where no operation time is set in the timer circuit 130i, such as the communication relay device 130 itself starts first, or a case where the slot time information (see FIG. 8), the slot assignment information (see FIG. 9), or the network architecture information (see FIG. 10) stored and held in the memory 130b is updated, the communication relay device 130 performs an operation time setting process of setting an operation time in the an timer circuit 130i. The communication relay device 130 except for the timer circuit 130i is in the so-called sleep state in a period except for a period sets as an operation time. In this manner, power consumption of the communication relay device 130 can be reduced, and the communication relay device 130 can operate in a longer period with limited electric power. Accordingly, management of a power supply of the communication relay device 130, for example, the amount of work such as replacement of batteries, can be reduced.

Figure 15:
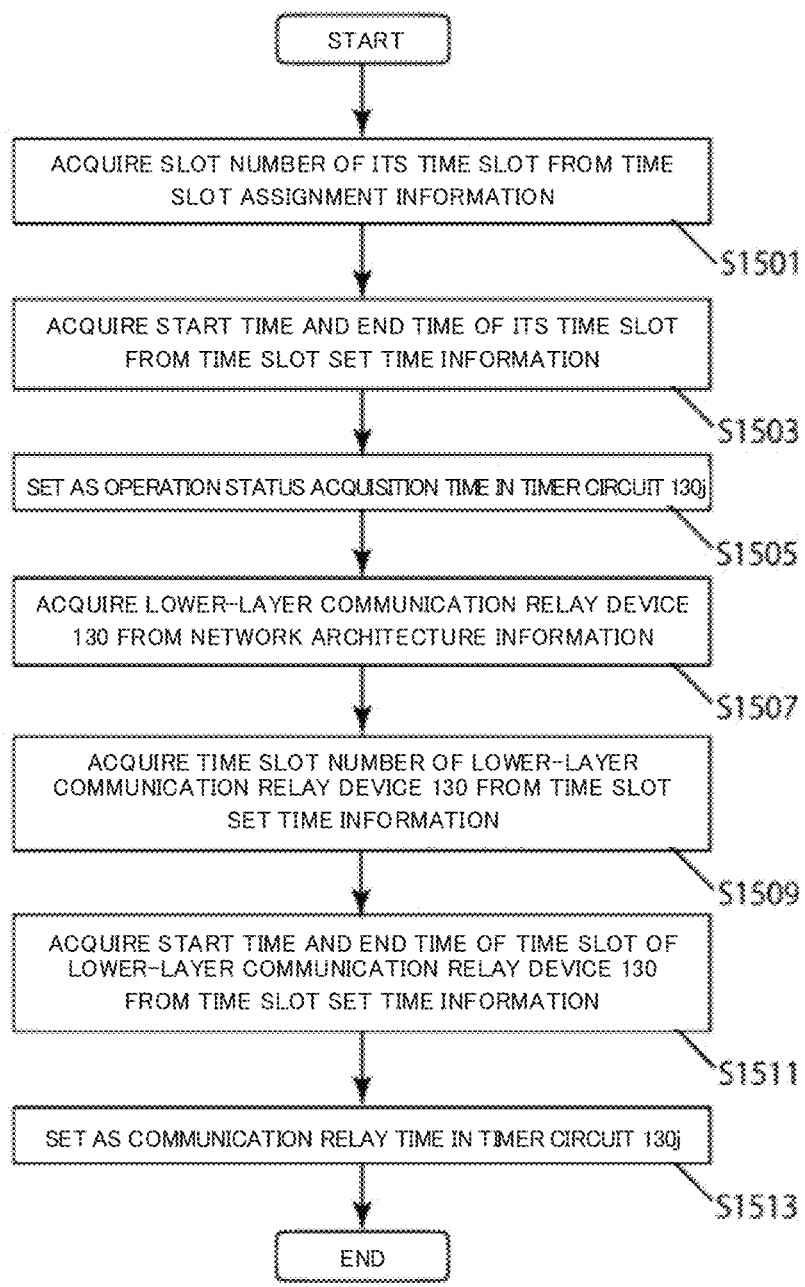
FIG. 15 is a flowchart depicting an operation time setting process.

The operation time setting process will be described with reference to the flowchart of FIG. 15. The CPU 130*a* of each communication relay device 130 acquires a slot number of its time slot TS from the slot assignment information stored and held in the memory 130*b* (S1501). The CPU 130*a* acquires a start time and an end time of its time slot TS from the slot time information stored and held in the memory 130*b* (S1503). The CPU 130*a* sets the acquired start time and end time in the timer circuit 130*i* as operation status acquisition time (S1505).

The CPU 130*a* acquires all the communication relay devices 130 at lower-layers with respect to the current communication relay device 130 itself, from the network architecture information (S1507). Specifically, the CPU 130*a* extracts the device ID of itself from the higher-layer ID listing region of the network architecture information and acquires corresponding device IDs in the lower-layer ID listing region. The CPU 130*a* extracts the acquired device IDs from the higher-layer ID listing region of the network architecture information and acquires corresponding device IDs in the lower-layer ID listing region. The CPU 130*a* repeats the foregoing operation until the acquired device IDs are not present any more in the higher-layer ID listing region of the network architecture information. If the device ID of itself is not present in the higher-layer ID listing region of the network architecture information, this indicates that the current communication relay device 130 is at the bottom end of the network.

The CPU 130*a* acquires slot numbers of time slots TS of communication relay devices 130 at lower-layers with respect to the current communication relay device 130, from the slot assignment information stored and held in the memory 130*b* (S1509). The CPU 130*a* acquires start times and end times corresponding to the slot numbers of the time slots TS of all the communication relay devices 130 at lower-layers with respect to the current communication relay device 130, from the slot time information stored and held in the memory 130*b* (S1511). The CPU 130*a* sets the acquired start times and end times in the timer circuit 130*i* as communication relay times (S1513).

In this manner, the CPU 130*a*, the memory 130*b*, the wireless communication circuit 130*h*, and the timer circuit 130*i* of each communication relay device 130 constitute a communication controller that switches the state between the active state and the sleep state with a smaller power consumption than that in the active state and performs communication with at least the management device 120 or another communication relay device 130 in the active state. The switching between the active state and the sleep state will be described later.

The CPU 130*a*, the memory 130*b*, and the timer circuit 130*i* constitute a slot determiner that determines arrival of a specific time slot assigned to one of the communication relay devices 130 and arrival of a relay slot that is a time slot assigned to another lower-layer communication relay device 130.

Here, in the network architecture illustrated in FIG. 11, an operation time setting process will be described using an example in which the slot time information, the slot assignment information, and the network architecture information are those shown in FIGS. 8, 9, and 10, respectively. In an operation time setting process for the device ID "R3", the CPU 130*a* acquires a slot number "4" of its time slot TS from the slot assignment information. The CPU 130*a* then acquires a start time "90" and an end time "120" of the slot number "4" from the slot time information, and sets the acquired start time and end time in the timer circuit 130*i* as operation status acquisition times.

Thereafter, the CPU 130*a* acquires a value "R4" of the lower-layer ID listing region corresponding to value "R3" in the higher-layer ID listing region of the network architecture information, and acquires a slot number "5" of a time slot TS corresponding to the acquired device ID "R4" from the slot assignment information. Subsequently, the CPU 130*a* acquires a start time "120" and an end time "150" of the slot number "5" from the slot time information, and sets the acquired start time and end time in the timer circuit 130*i* as a communication relay time.

In an operation time setting process for the device ID "R4", the CPU 130*a* acquires the slot number "5" of its time slot TS from the slot assignment information. The CPU 130*a* then acquires the start time "120" and the end time "150" of the slot number "5" from the slot time information, and sets the acquired start time and end time in the timer circuit 130*i* as an operation status acquisition time.

On the other hand, since the value of the lower-layer ID listing region corresponding to the value "R4" in the higher-layer ID listing region of the network architecture information is not present, the CPU 130*a* determines that the CPU 130*a* itself is the bottom-end communication relay device 130, and does not set a communication relay time in the timer circuit 130*i*.

Figure 16:
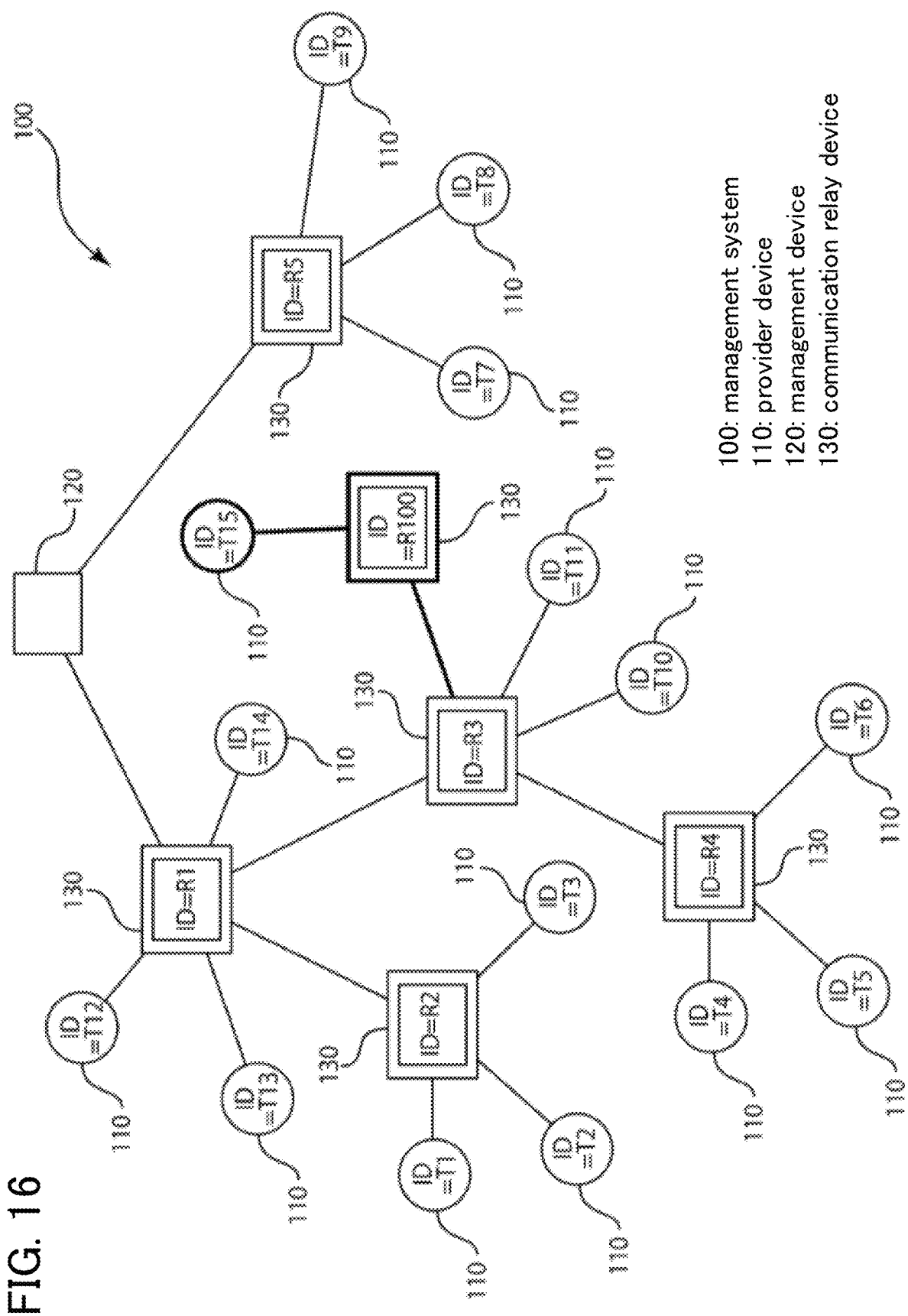
FIG. 16 is a diagram illustrating an example network architecture after change.

Next, as illustrated in FIG. 16, description will be given on an operation time setting process when the network architecture illustrated in FIG. 11 is changed to a network architecture in which a communication relay device 130 and a provider device 110 that is at an-layer lower than this communication relay device 130 and directly communicates with the communication relay device 130 is added. In the network architecture illustrated in FIG. 16, a communication relay device 130 with a device ID "R100" is added at a lower-layer of the communication relay device 130 with the device ID "R3". A provider device 110 with a device ID "T15" is added at a lower-layer of the communication relay device 130 with the device ID "R100".

In this case, the slot time information does not need to be changed from the information shown in FIG. 8. On the other hand, as shown in FIG. 17, the slot assignment information is changed in such a manner that a slot number "119" of the time slot TS is assigned with the added communication relay device 130 with the device ID "R100". As illustrated in FIG. 18, in the network architecture information, the device ID "R100" is added in the lower-layer ID listing region, and the device ID "R3" is added in the higher-layer ID listing region in correspondence with the device ID "R100". In this manner, even in the case of adding a new communication relay device 130, it is sufficient to change only the slot assignment information and the network architecture information.

Figure 19:
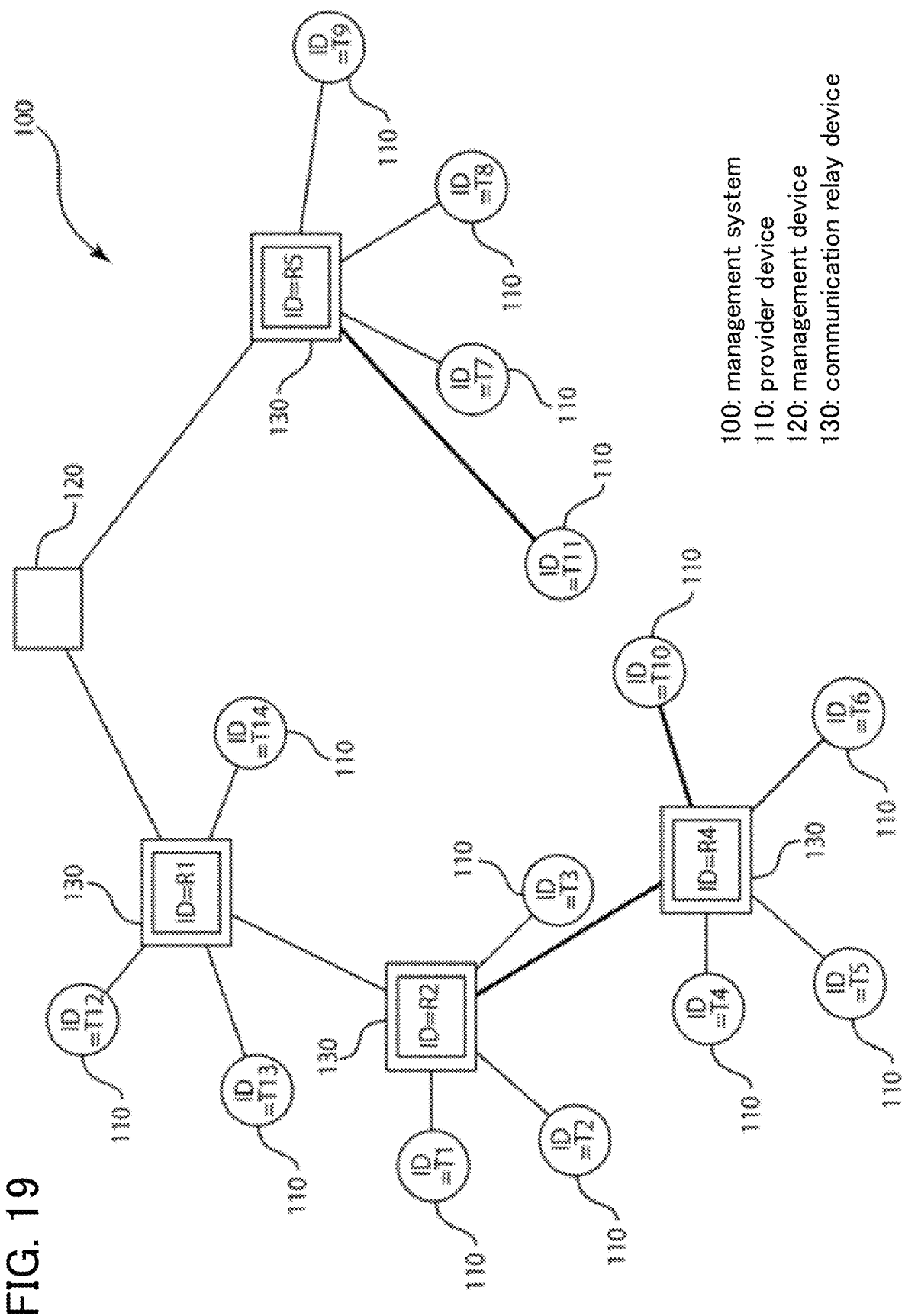
FIG. 19 is a diagram showing another example of the network architecture after change.

Description will now be given on an operation time setting process when the network architecture illustrated in FIG. 11 is changed to a network architecture in which one communication relay device 130 is deleted as illustrated in FIG. 19. In the network architecture illustrated in FIG. 19, the communication relay device 130 with the device ID "R3" is deleted. As described above, examples of the case of deleting a certain communication relay device 130 include the case of stopping an operation for maintenance or other reasons, and the case of previously changing a communication path in-layer to avoid degradation of a communication status because of installation of scaffolding or the like for maintenance of the process system in which the management system 100 is disposed.

Figures 20, 21, 22:
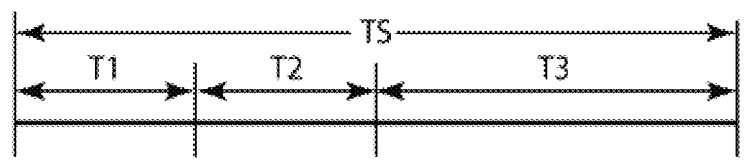
FIG. 20 is a table showing a data structure of another network architecture information after change.
FIG. 21 is a table showing a data structure of operation status relay time information after change.
FIG. 22 is a diagram representing time assignment in a time slot.

In these cases, the slot time information and the slot assignment information do not need to be changed. On the other hand, as shown in FIG. 20, in network architecture information, the device ID "R3" in the lower-layer ID listing region and its corresponding value "R1" in the higher-layer ID listing region are deleted. In the case of deleting the communication relay device 130 as described above, it is sufficient only to change the network architecture information.

With respect to the provider devices 110 with the device IDs "T10" and "T11", communication relay devices 130 that communicate directly with these provider devices 110 are changed because of deleting the communication relay device 130 with the device ID "R3". For example, in the example illustrated in FIG. 19, the provider device 110 with the device ID "T10" directly communicates with the communication relay device 130 with the device ID "R4" and the provider device 110 with the device ID "T11" directly communicates with a communication relay device 130 with a device ID "R5". In this case, in the operation status time information of the communication relay device 130 with the device ID "R4", as illustrated in FIG. 21, the provider device 110 with the device ID "T10" is added. Although not shown, in the operation status time information of the communication relay device 130 with the device ID "R5", the provider device 110 with the device ID "T11" is added.

(2) Operation Status Acquisition Transmission Process

Operation status acquisition transmission process is a process in which one of the communication relay devices 130 acquires operation status information from the provider device 110 that is at a lower-layer of this communication relay device 130 and directly communicates with the communication relay device 130, and transmits the acquired operation status information to the management device 120. In the management system 100, each communication relay device 130 acquires operation status information from the provider device 110 and transmits the acquired operation status information to the management device 120 within a time of its time slot TS.

FIG. 22 shows time assignment to processes in a time slot TS. One of the communication relay devices 130 acquires operation status information in a period T1 after start of the time slot TS, from the provider device 110 which is at a lower-layer of this communication relay device 130 and with which the communication relay device 130 can directly communicate. This communication relay device 130 transmits the acquired operation status information to the management device 120 in a period T2 subsequent to the period T1. A period T3 subsequent to the period T2 is assigned as a stand-by device period, and is used as appropriate.

Figure 23:
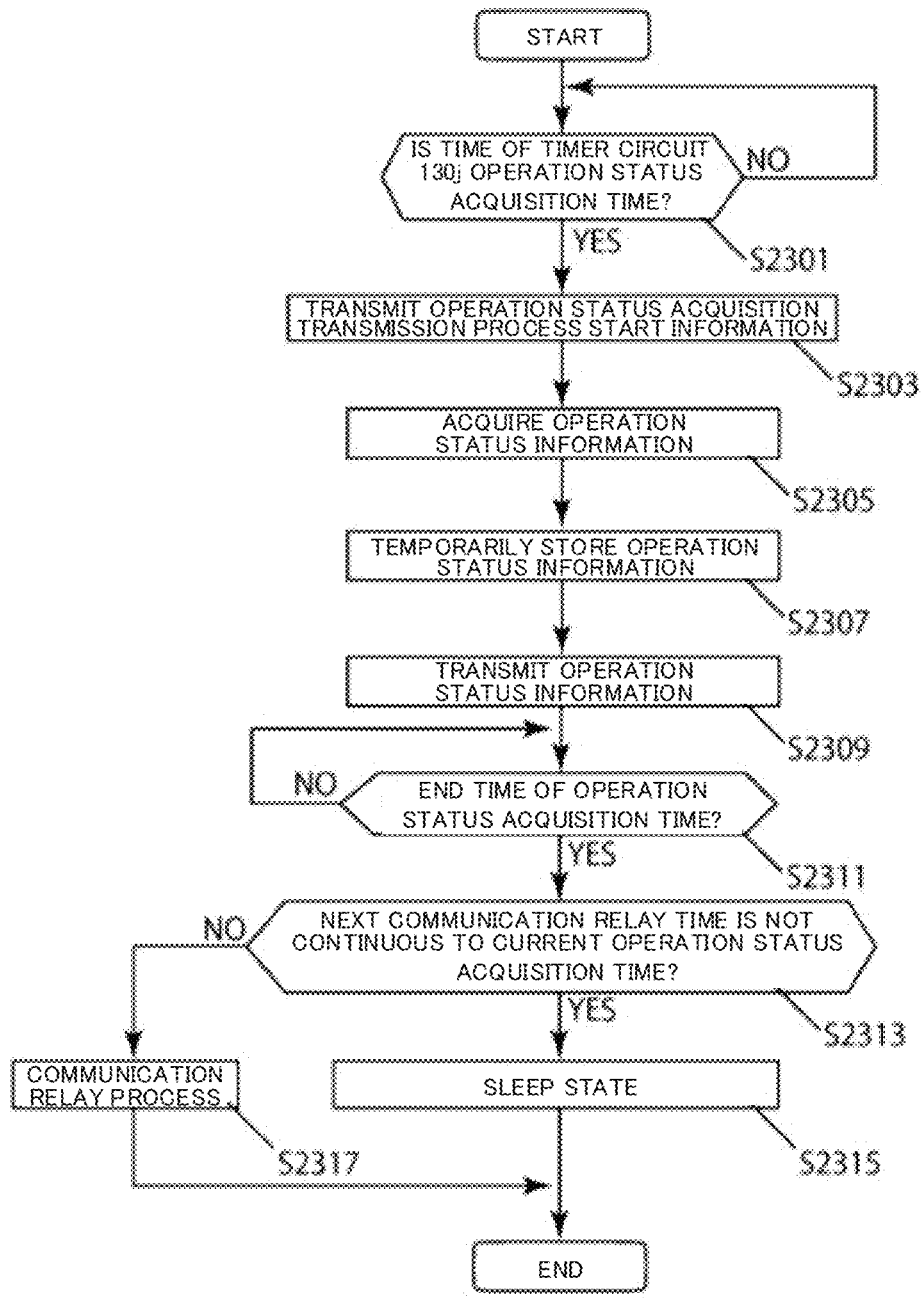
FIG. 23 is a flowchart depicting an operation status acquisition transmission process of a communication relay device.

An operation of each communication relay device 130 in the operation status acquisition transmission process will be described with reference to the flowchart of FIG. 23. The communication relay device 130 uses the timer circuit 130i to measure a time from the start of an acquisition cycle fB in a current cycle.

If the timer circuit 130i of the communication relay device 130 determines that the measured time reaches a start time of the operation status acquisition time (S2301), the timer circuit 130i transmits operation status acquisition transmission process start information (hereinafter also referred to as "transmission start information") to the CPU 130a (S2303). In a case where the CPU 130a of the communication relay device 130 is in the sleep state, the timer circuit 130i activates the CPU 130a.

Here, with respect to the start time of the operation status acquisition time, that is, the start time of a time slot TS assigned to the communication relay device 130, the CPU 130a extracts a slot number corresponding to its device ID from the slot assignment information (see FIG. 9), acquires a start time corresponding to the extracted slot number from the slot time information (see FIG. 8), and sets the start time in the timer circuit 130i, at a predetermined time.

When the CPU 130a acquires the transmission start information, the CPU 130a acquires operation status information from the provider device 110 which is at a lower-layer of the current communication relay device 130 and with which the current communication relay device 130 can directly communicate (S2305).

In addition, when the CPU 130a acquires the transmission start information at step S2305, the CPU 130a starts measuring time with the timer circuit 130i, and sequentially acquires operation status information from the provider devices 110 with corresponding device IDs while checking the measured time with the start time and the end time in the operation status time information (see FIG. 12).

The CPU 130a temporarily stores and holds the received operation status information in the memory 130b together with the reception time point in association with the provider device 110 that transmitted the received operation status information (S2307). Then, the CPU 130a transmits the operation status information temporarily stored and held in the memory 130b, to the management device 120 (S2309).

Figure 24:
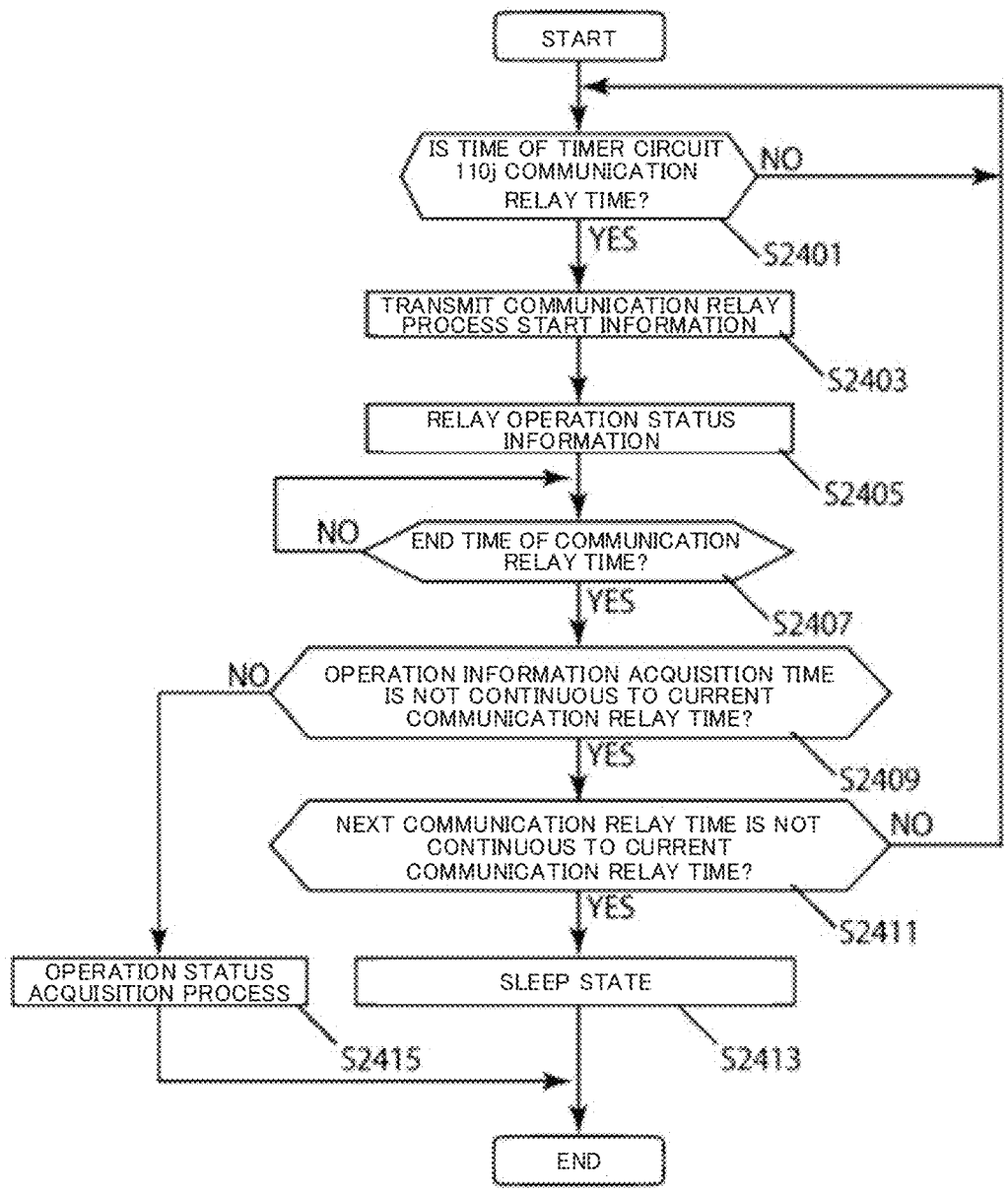
FIG. 24 is a flowchart depicting a communication relay process.

When the CPU 130a determines that the end time of the operation status acquisition time has arrived (S2311), if the start time of the next communication relay time is not continuous to the current operation status acquisition time (S2313), the CPU 130a changes to the sleep state (S2315). At this time, the timer circuit 130i does not change to the sleep state. On the other hand, if the start time of the next communication relay time is continuous to the current operation status acquisition time, the CPU 130a performs a communication relay process (described later; see FIG. 24) (S2317).

(3) Communication Relay Process

The communication relay process is a process in which when one of the communication relay devices 130 transmits operation status information to the management device 120 using the time slot system, another communication relay device 130 on a communication path from the former communication relay device 130 to the management device 120 relays transmission of the operation status information. The communication relay process will be described with reference to the flowchart of FIG. 24.

If the timer circuit 130i of each communication relay device 130 determines that the measured time reaches a start time of the communication relay time (S2401), the timer circuit 130i transmits communication relay process start information (hereinafter also referred to as a "relay start information") to the CPU 130a (S2403). In a case where the CPU 130a of the communication relay device 130 is in the sleep state, the timer circuit 130i activates the CPU 130a.

The CPU 130a transmits the operation status information acquired through the wireless communication circuit 110h (i.e., received from a lower-layer communication relay device 130) to a higher-layer communication relay device 130 or the management device 120 (S2405).

When the CPU 130a determines that the end time of the communication relay time has arrived (S2407), if the operation status acquisition time is not continuous to the current communication relay time (S2409) and the next communication relay time is not continuous to the current communication relay time (S2411), the CPU 130*a* changes to the sleep state (S2413). At this time, the timer circuit 130*i* does not change to the sleep state.

On the other hand, if the next operation status acquisition time is continuous to the current communication relay time at step S2409, the CPU 130*a* performs an operation status acquisition transmission process (see FIG. 23) (S2415). At step S2411, if the next communication relay time is continuous to the current communication relay time, the CPU 130*a* repeats S2401 and processes after step S2401.

2. Operation of Provider Device 110

Figure 25:
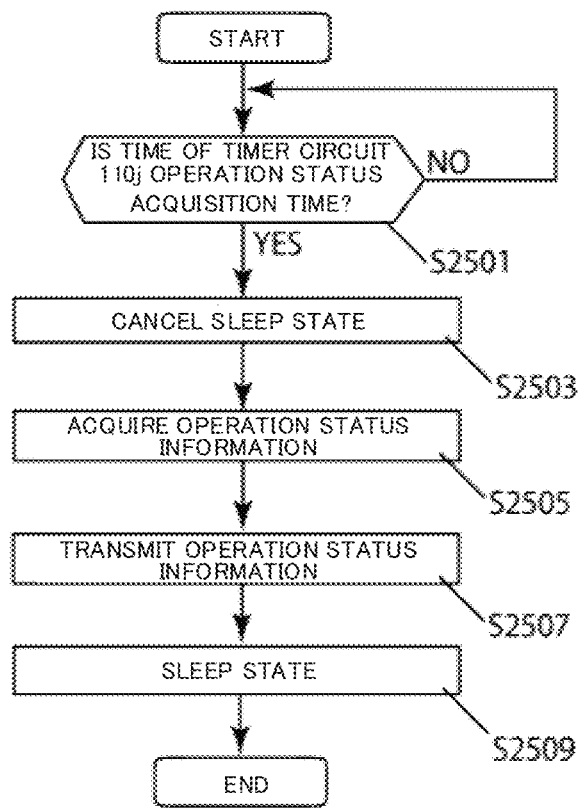
FIG. 25 is a flowchart depicting an operation status acquisition transmission process of the provider device.

An operation of each provider device 110 in the operation status acquisition transmission process will be described with reference to the flowchart of FIG. 25. The provider device 110 measures a time before next operation status information is transmitted to the communication relay device 130, with the timer circuit 110*j*. After the provider device 110 transmits operation status information to the communication relay device 130, the CPU 110*a* and predetermined circuits including the wireless communication circuit 110*h* except the timer circuit 110*j* are changed to sleep states.

If the timer circuit 110*j* of the provider device 110 determines that the measured time reaches the time at which operation status information is to be transmitted to the communication relay device 130 (S2501), the timer circuit 110*j* activates the sleep-state CPU 110*a* (S2503).

The CPU 110*a* acquires operation status information from various sensors such as a temperature sensor and a vibration sensor through the sensor communication circuit 110*i* (S2505). The CPU 110*a* transmits the acquired operation status information to a higher-layer communication relay device 130 (S2507). Thereafter, the CPU 110*a* changes the predetermined circuits including the CPU 110*a* itself to sleep states (S2509). Before the change to the sleep state, the CPU 110*a* acquires a time before next operation status information is to be transmitted to the communication relay device 130 from the communication relay device 130, and sets the acquired time in the timer circuit 110*j*.

Other Embodiments (1) Process System Constituent Device

Although steam traps T are used as the process system constituent devices in the foregoing description, the process system constituent devices are not limited to the above example. For example, the process system constituent devices may be pressure reducing valves G or valves V illustrated in FIG. 1. The process system constituent devices may also be various fluid controlling devices such as pumps, separators, or filters. In this manner, operation statuses of devices except the steam traps T can be monitored by using the provider devices 110.

(2) Slot Time Information, Slot Assignment Information, and Network Architecture Information In the foregoing description, the slot time information is stored and held in each communication relay device 130. Alternatively, the management device 120 may generate and transmit, to each communication relay device 130, extracted slot time information obtained by extracting only a part of the slot time information concerning other communication relay devices 130 at lower-layers. The same also holds for the slot assignment information and the network architecture information.

(3) Change of Communication Network Architecture

In the foregoing description, in a case where the communication network architecture is changed and new slot time information, new slot assignment information, and new network architecture information are generated, the entire new information is transmitted to the communication relay device 130. Alternatively, only a changed part of the new information may be transmitted so that the communication relay device 130 generates new slot time information, new slot assignment information, and new network architecture information.

(4) Time Setting to Timer Circuit 130*i*

Although the operation information acquisition time and the communication relay time are set in the timer circuit 130*i* in the foregoing description, these times are not limited to the above examples as long as the timer circuit 130*i* can cancel a sleep state. For example, the operation information acquisition time and the communication relay time may be stored and held in the memory 130*b* so that the timer circuit 130*i* can acquire the times from the memory 130*b* when necessary.

(5) Start Times and End Times of Operation Information Acquisition Time and Communication Relay Time In the foregoing description, when the start time of the operation information acquisition time or the communication relay time arrives, sleep states of the CPU 130*a* and other circuits are canceled and the process starts. Alternatively, the sleep states of the CPU 130*a* and other circuits may be cancelled at a predetermined time before the start time of the operation information acquisition time or the communication relay time. The same holds for processes to be performed at the end time of the operation information acquisition time or the communication relay time.

(6) Hardware of Each Device

Although each of the provider devices 110, the management device 120, and the communication relay devices 130 obtains the function thereof by using the CPUs 110*a*, 120*a*, and 130*a* in the foregoing description, the provider devices 110, the management device 120, and the communication relay devices 130 are not limited to these examples as long as the functions thereof can be obtained. For example, a logic circuit that can obtain the function of each device may be designed and used.

(7) Flowchart for Each Program

Although the processes are performed according to the flowcharts of FIGS. 15 and 23 through 25 in the management system 100 in the foregoing description, the processes are not limited to these examples as long as the functions and objects of the processes can be achieved.

(8) Data Structure

Although the processes are performed using the data shown in FIGS. 8 through 10 and 12 in the management system 100 in the foregoing description, the processes are not limited to these examples as long as the functions and the objects of processes can be achieved.

Features and advantages effects of this embodiment will be hereinafter described.

[1] A communication relay device constituting a communication network and previously assigned with a time slot that is a communication time frame defined in a predetermined length of time, includes:

a communication relay section that relays communication from another lower-layer communication relay device to another higher-layer communication relay device;

a time slot determination section that determines whether a current time point corresponds to a time slot of the lower-layer communication relay device in the communication network or not;

a communication operation section that causes the communication relay section to operate if the current time point corresponds to the time slot of the lower-layer communication relay device; and a communication stop section that stops an operation of the communication relay section if the current time point does not correspond to the time slot of the lower-layer communication relay device.

Figure 26:
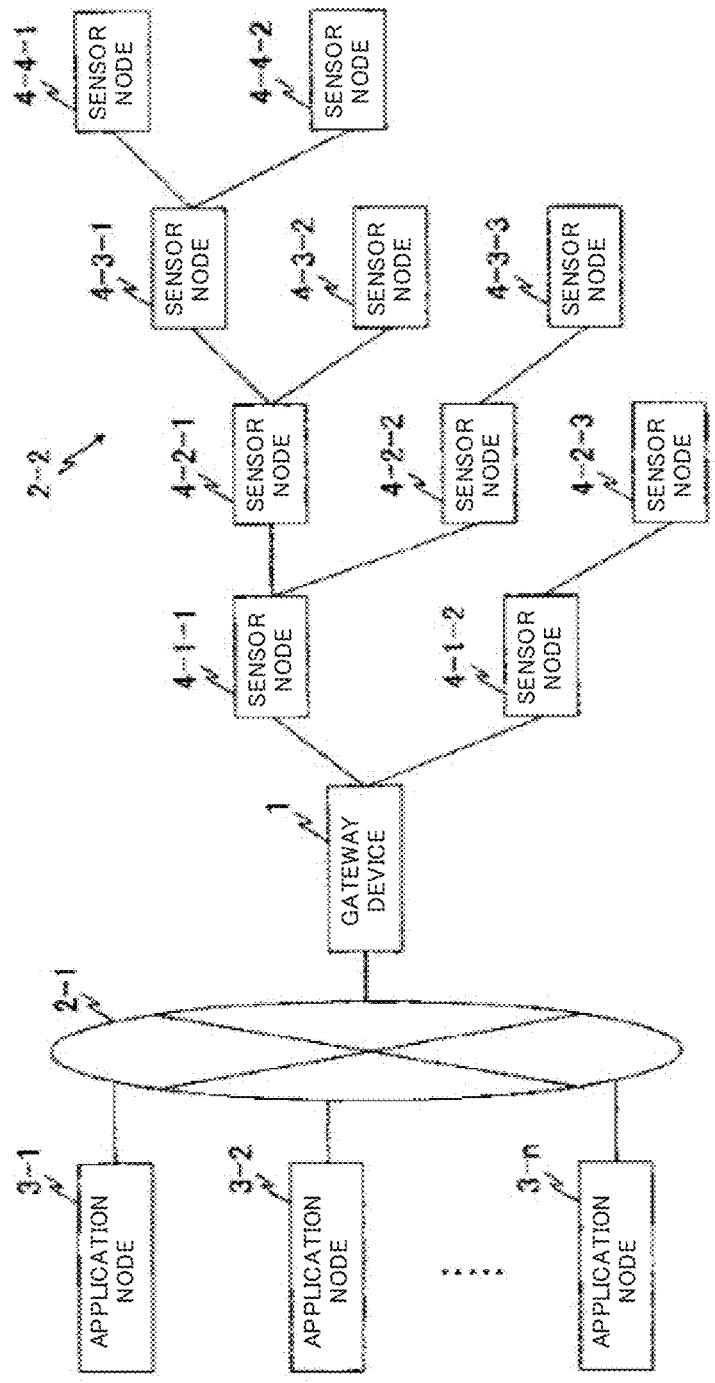
FIG. 26 is a diagram illustrating a typical communication relay device.

A typical communication relay device will be described using a gateway device 1 illustrated in FIG. 26. The gateway device 1 sequentially sets packet transmission times in the descending-layer of a hop count or a child node count of each sensor node. In general, as the hop count or the child node count increases, packet collision more frequently occurs. This gateway device, however, sets a packet transmission time while placing priority to nodes with large hop counts or child node counts, and thus, packet collision is less likely to occur. Consequently, packets do not need to be sent again, and thus, the difference between an intended packet acquisition time point and an actual packet acquisition time point in an application node decreases. Accordingly, the application node can acquire data at an intended time.

In addition, the gateway device 1 can assign a larger number of packet transmissions to a sensor node having a large hop count and a large child node count (i.e., a sensor node with high probability of occurrence of packet collision) in setting a packet transmission time for each sensor node. Sensor nodes with high probabilities of occurrence of packet collision continuously transmit packets, and thus, a margin is substantially provided in a packet acquisition period in an application node. Accordingly, the application node can easily acquire data at an intended time.

This gateway device 1 has the following tasks to be improved. The gateway device 1 sets a packet transmission time by using network architecture table listing hop counts and child node counts (see FIG. 27). In a case where the network architecture is changed, hop counts and child node counts of sensor nodes in the entire network need to be calculated again so that the network architecture table is updated. For this reason, setting of the packet transmission time in a case where the network architecture is changed becomes complex, which is a point to be improved.

This embodiment has an object of providing a communication relay device that can easily perform a communication relay process even when a communication network architecture is changed.

The communication relay device according to this embodiment can establish communication with another lower-layer communication relay device only by determining whether a current time slot is a time slot of the lower-layer communication relay device or not. Thus, even with a change of the communication network architecture, a communication relay process can be easily performed.

[2]

The communication relay device according to [1] has a feature in which the time slot determination section determines whether the current time point correspond to the time slot of the lower-layer communication relay device or not by using time slot assignment information indicating a time slot assigned to the lower-layer communication relay device.

In this manner, even with a change of a communication network architecture, the communication relay process can be easily performed only by changing the time slot assignment information.

[3]

The communication relay device according to [1] or [2] has a feature in which the time slot determination section determines whether the current time point corresponds to the time slot of the lower-layer communication relay device or not by using network architecture information indicating a connection relationship among communication relay devices included in the communication network.

Accordingly, even with a change of the communication network architecture, the communication relay process can be performed only by changing the network architecture information.

[4]

The communication relay device according to any one of [1] to [3] has a feature in which the communication relay section includes an information acquisition transmission section that temporarily stores information acquired from an information collecting device that directly communicates with the communication relay section and transmits the temporarily stored information to another higher-layer communication relay device in an assigned time slot.

Accordingly, since the communication relay device temporarily stores and holds information, a synchronous process is needed only between the communication relay device and the information collecting device, and no synchronous process is needed in the entire communication network. Thus, traffic can be reduced as the entire communication network.

[5]

A communication relay program causing a computer to function as a communication relay device constituting a communication network and previously assigned with a time slot that is a communication time frame defined in a predetermined length of time, causes the computer to function as:

a communication relay section that relays communication from another lower-layer communication relay device to another higher-layer communication relay device;

a time slot determination section that determines whether a current time point corresponds to a time slot of the lower-layer communication relay device in the communication network or not;

a communication operation section that causes the communication relay section to operate if the current time point corresponds to the time slot of the lower-layer communication relay device; and a communication stop section that stops an operation of the communication relay section if the current time point does not correspond to the time slot of the lower-layer communication relay device.

Accordingly, communication with another lower-layer communication relay device can be established only by determining whether a current time slot is a time slot of the lower-layer communication relay device or not. Thus, even with a change of a communication network architecture, a communication relay process can be easily performed.

[6]

A communication relay method using a communication relay device constituting a communication network and previously assigned with a time slot that is a communication time frame defined in a predetermined length of time, includes:

determining whether a current time point corresponds to a time slot of another lower-layer communication relay device in the communication network or not;

causing a communication relay section of the communication relay device to relay communication from the lower-layer communication relay device to another higher-layer communication relay device if a current time point corresponds to a time slot of the communication relay device; and stopping an operation of the communication relay section if the current time point does not correspond to the time slot of the lower-layer communication relay device.

Accordingly, communication with another lower-layer communication relay device can be established only by determining whether a current time slot is a time slot of the lower-layer communication relay device or not. Thus, even with a change of a communication network architecture, a communication relay process can be easily performed.

Here, a correlation between components in [1] through [6] and components in an exemplary embodiment will be described. The "communication relay device" in [1] through [6] corresponds to a "communication relay device 130" in the exemplary embodiment. The "information collecting device" in [1] through [6] corresponds to a "provider device 110" in the exemplary embodiment.

The "communication relay section" in [1] through [6] corresponds to a "CPU 130$a$", a "memory 130$b$", a "wireless communication circuit 130$h$" in the exemplary embodiment. The "time slot determination section" in [1] through [6] corresponds to the "CPU 130$a$" and the "memory 130$b$" in the exemplary embodiment. The "communication operation section" in [1] through [6] corresponds to the "CPU 130$a$", the "memory 130$b$", and the "wireless communication circuit 130$h$" in the exemplary embodiment. The "communication stop section" in [1] through [6] corresponds to the "CPU 130$a$", the "memory 130$b$", and the "wireless communication circuit 130$h$" in the exemplary embodiment. The "information acquisition transmission section" in [1] through [6] corresponds to a "CPU 110$a$", a "memory 110$b$", and a "wireless communication circuit 110$h$" in the exemplary embodiment.

Exemplary Embodiment

Next, a specific exemplary embodiment will be described.
<Connection Relationship among Communication Terminals>

In a management system 100, connection destinations of individual communication terminals are defined, and based on their connection relationship, propagation of signals is performed. The management system 100 holds, as a connection relationship among a management device 120, communication relay devices 130, and provider devices 110, network architecture information that defines a tree structure of a network, a routing table that defines a route to a final transmission destination, a sensor table that defines a connection relationship between the provider devices 110 and the communication relay devices 130, sensor connection information that specifies the provider devices 110 connected, and relay device connection information that specifies the communication relay devices 130 connected.

The network architecture information (a so-called tree table) is a table that defines the tree structure of the management system 100 and defines higher-layer communication terminals of the respective communication relay devices 130. One unit of network architecture information is formed by the management system 100, and the management device 120 and all the communication relay devices 130 hold the network architecture information in common. FIG. 28 shows network architecture information corresponding to the management system 100 illustrated in FIG. 11. The upper column of the network architecture information shows device IDs of communication relay devices 130, that is, lower-layer communication terminals, and the lower column shows device IDs of higher-layer communication terminals (the management device 120 or the communication relay devices 130) to which the communication relay devices 130 are connected, that is, higher-layer communication terminals.

The routing table shows a relationship between all the communication terminals as final transmission destinations to which one communication terminal can reach and next (one-hop preceding) communication terminals on communication paths from the one communication terminal to the final transmission destinations, that is, communication terminals at an-layer one-hop lower than the one communication terminal on communication paths to the final transmission destinations. The routing table is created based on the network architecture information. Each of the management device 120 and the communication relay devices 130 holds its unique routing table. FIG. 29 is a routing table of the communication relay device 130 with the device ID "R1" in the management system 100 illustrated in FIG. 11. The upper column of the routing table shows final transmission destinations, and the lower column shows one-hop preceding communication relay devices 130 in a case where the communication relay device 130 with the device ID "R1" is a start point. Since the communication relay device 130 with the device ID "R1" can reach the communication relay devices 130 with the device IDs "R2", "R3", and "R4", communication relay devices 130 at one-hop lower-layers of the communication relay device 130 with the device ID "R1" on communication paths to these communication relay devices 130 are respectively defined. Since the communication relay device 130 with the device ID "R1" cannot reach the communication relay device 130 with the device ID "R5", the routing table of the communication relay device 130 with the device ID "R1" does not show a one-hop preceding communication relay device 130 in a case where the final transmission destination is the communication relay device 130 with the device ID "R5".

The sensor table defines a connection relationship between the provider devices 110 and the communication relay devices 130 (i.e., to which one of the communication relay devices 130 each of the provider devices 110 is connected). One sensor table is created by the management system 100, and is held by the management device 120. FIG. 30 is a sensor table corresponding to the management system 100 illustrated in FIG. 11. The upper column of the sensor table shows provider devices 110, and the lower column defines communication relay devices 130 to which the individual provider devices 110 are connected.

Sensor connection information is information held by each of the communication relay devices 130, and is information specifying the provider devices 110 to which the communication relay devices 130 are connected (e.g., communication addresses of the provider devices 110).

Relay device connection information is information held by each provider device 110, and is information specifying a communication relay device 130 to which this provider device 110 is connected (e.g., a communication address of the communication relay device 130).

The HDD 120$c$ of the management device 120 stores network architecture information, a sensor table, and a routing table. The memory 130$b$ of each communication relay device 130 stores network architecture information, a routing table, and a sensor connection information. The memory 110b of each provider device 110 stores relay device connection information.

In the management system 100, signal propagation is performed by using connection relationship among these devices.

First, a case where a signal is transmitted from the management device 120 in a downlink direction will be described. For example, in a case where the management device 120 requests information from a provider device 110 with a device ID "T6", based on the sensor table, the management device 120 determines the communication relay device 130 with the device ID "R4" to which the provider device 110 with the device ID "T6" is connected. Then, the management device 120 determines, based on the routing table of itself, that the one-hop preceding communication relay device 130 in a case where the final transmission destination is the communication relay device 130 with the device ID "R4" is the communication relay device 130 with the device ID "R1". The management device 120 transmits a signal indicating that the communication relay device 130 with the device ID "R4" is set as the final transmission destination and the communication relay device 130 with the device ID "R1" is set as a one-hop preceding transmission destination. In subsequent processes, each communication relay device 130 that has received this signal changes the one-hop preceding communication relay device 130 based on the routing table of itself, and propagates the signal to the communication relay device 130 with the device ID "R4". Specifically, the communication relay device 130 with the device ID "R1" sets the communication relay device 130 with the device ID "R3" as a one-hop preceding transmission destination, and transfers the signal. The communication relay device 130 with the device ID "R3" that has received the signal sets the communication relay device 130 with the device ID "R4" as a one-hop preceding transmission destination, and transfers the signal. In this manner, the signal reaches the communication relay device 130 with the device ID "R4" as the final transmission destination.

Next, a case where a signal is transmitted to the management device 120 in an uplink direction. For example, in the above description, the communication relay device 130 with the device ID "R4" that has received the signal from the management device 120 transmits the signal including information from the provider device 110 with the device ID "T6" to the management device 120. In this case, based on the network architecture information, the communication relay device 130 with the device ID "R4" determines that the communication relay device 130 at a one-hop higher-layer is the communication relay device 130 with the device ID "R3". The communication relay device 130 with the device ID "R4" transmits a signal indicating that the management device 120 is set as the final transmission destination and the communication relay device 130 with the device ID "R3" is set as a one-hop preceding transmission destination. In subsequent processes, based on the network architecture information, each communication relay device 130 that has received this signal changes the one-hop preceding communication relay device 130, and propagates the signal to the management device 120. Specifically, the communication relay device 130 with the device ID "R3" sets the communication relay device 130 with the device ID "R1" as the one-hop preceding transmission destination, and transfers the signal. The communication relay device 130 with the device ID "R1" sets the management device 120 as the one-hop preceding transmission destination, and transfers the signal. In this manner, the signal is finally received by the management device 120.

In the manner described above, the management device 120 and the communication relay devices 130 transmit signals based on a connection relationship among the communication terminals (including the network architecture information, the routing table, the sensor table, the sensor connection information, and the relay device connection information).

<Communication Schedule>

The thus-configured management system 100 performs a collection process of collecting operation status information of the provider devices 110 in the management device 120, as a normal operation. The management device 120 communicates with each communication relay device 130 according to a communication schedule shown in FIG. 31, and collects operation status information of the provider device 110 associated with the communication relay device 130, that is, connected to the communication relay device 130.

The communication schedule of FIG. 31 shows one cycle of a collection process, and this cycle is the acquisition cycle fB. The communication schedule is repeatedly performed in the acquisition cycles fB. The communication schedule is divided into a plurality of time slots TS described above. The number of time slots is larger than the total number of the management device 120 and the communication relay devices 130.

Each communication relay device 130 is assigned with a specific time slot. Each communication relay device 130 communicates with the management device 120 in a corresponding time slot, and transmits operation status information from the provider device 110 connected to this communication relay device 130 to the management device 120 (this process will be hereinafter also referred to as a "reply process"). The reply process is an example of a predetermined communication process. Basically, each communication relay device 130 changes to the active state in an assigned specific time slot (hereinafter also referred to as a "specific slot"), and otherwise, is in the sleep state. It should be noted that each communication relay device 130 disposed on a communication path between the other communication relay devices 130 and the management device 120 needs to perform a relay process in a case where a lower-layer communication relay device 130 communicates with the management device 120. Thus, this communication relay device 130 is also in the active state in a time slot assigned to the lower-layer communication relay device 130, that is, a slot specific to the lower-layer communication relay device 130 (corresponding to a relay time slot; hereinafter also referred to as a "relay slot"), and performs the relay process. Each provider device 110 transmits operation status information to the communication relay device 130 connected to the provider device 110 in a specific slot of this communication relay device 130, and thus, is in the active state in the specific slot of the communication relay device 130. Each provider device 110 is basically in the sleep state while the provider device 110 does not need to transmit operation status information to the communication relay device 130.

In the communication schedule of FIG. 31, the time slots are defined in a matrix. Slot numbers specifying time slots are expressed by columns and rows. For example, the slot number of the time slot assigned with the communication relay device 130 with the device ID "R1" is expressed by column L1 and row N1. Basically, the time slots are assigned in accordance with a hierarchy of a communication path of a tree structure. Specifically, each column is assigned with a level of the hierarchy of the tree structure. For example, column L0 is assigned with the management device 120, column L1 is assigned with the first layer (i.e., having a hop count of 1 (one)), and column L2 is assigned with a second layer (i.e., having a hop count of 2). The same holds for the third layer and subsequent layers.

In general, each communication relay device 130 is assigned with one time slot. The communication relay devices 130 with the device IDs "R1" and "R5" in the first layer are assigned with a time slot in column L1. The communication relay devices 130 with the device IDs "R2" and "R3" in the second layer are assigned with time slots in column L2. The communication relay device 130 with the device ID "R4" in the third layer is assigned a the time slot in column L3. On the other hand, since the management device 120 has a larger amount of processing contents than each communication relay device 130, the management device 120 is assigned with not one time slot but a plurality of time slots (all the time slots in column L0 in FIG. 31). Since the number of time slots included in a column differs from the number of communication relay devices 130 included in each layer (where the number of time slots included in one column is generally larger), some time slots included in a column are not assigned with relay devices.

As described above, in a specific slot of one communication relay device 130, the provider device 110 connected to this communication relay device 130 is also in the active state, and thus, the specific time slot is also substantially assigned to each provider device 110. It should be noted that since a plurality of provider devices 110 can be connected to one communication relay device 130 in some cases. In such cases, the specific slot of this communication relay device 130 is assigned with the plurality of provider devices 110. For example, in the example of FIG. 31, the time slot represented by column L3 and row N1 is assigned with the communication relay device 130 with the device ID "R4". Since the three provider devices 110 with device IDs "T4", "T5", and "T6" are connected to the communication relay device 130 with the device ID "R4" (see FIG. 11), these three provider devices 110 are substantially assigned to the time slot represented by column L3 and row N1.

In the communication schedule, processing of time slots proceeds in the column direction. For example, in a column (e.g., column L1), processing of time slots proceeds in the ascending order with respect to the row number (i.e., in the order from row N1 to row Nm). When the processing of the time slot with the last row number (row Nm) in this row finishes, processing proceeds in the same order from the time slot with the first row number (row N1) in the next column (e.g., column L2).

<Determination of Connection Relationship and Assignment of Time Slot>

In establishing a communication path of the network, the management device 120 determines a connection relationship among communication terminals and performs assignment of time slots to complete a communication schedule.

For example, the device 120 determines which ones of communication terminals are connected to each other, that is, a connection relationship among the management device 120, the communication relay devices 130, and the provider devices 110, and creates network architecture information and a sensor table. In addition, based on the network architecture information, the management device 120 creates a routing table. When the connection relationship is determined in this manner, the management device 120 assigns time slots to the communication relay devices 130, and completes a communication schedule. The management device 120 stores the network architecture information, the sensor table, the routing table, and the communication schedule (i.e., slot assignment information) in an HDD 120c.

When the management device 120 completes assignment of time slots, the management device 120 notifies each of the communication relay devices 130 of the network architecture information and the slot assignment information (or a slot number of a specific slot). In a case where notification of the slot number of the specific slot is issued, the communication relay device 130 that needs to perform a relay process of its lower-layer communication relay device 130 is notified of, as the slot assignment information, a specific slot of the lower-layer communication relay device 130, that is, the slot number of a relay slot, in addition to the slot number of a specific slot of itself. Based on the sensor table, the management device 120 notifies each communication relay device 130 of the sensor connection information, and notifies each provider device 110 of the relay device connection information.

Each communication relay device 130 creates a routing table based on the network architecture information. The communication relay device 130 notifies the provider device 110 connected to the communication relay device 130 of the slot number of a specific slot of the communication relay device 130. The communication relay device 130 stores the slot numbers of the specific slot and the relay slot (i.e., the slot assignment information), the network architecture information, the routing table, and the sensor connection information in the memory 130b.

Each provider device 110 stores the slot number of a specific slot of the communication relay device 130 connected to the provider device 110 (i.e., the slot assignment information) and the relay device connection information in a memory 110b.

<System Operation>

—Collection Process—

In the collection process, the management device 120 proceeds processing according to the communication schedule. Specifically, the management device 120 performs processing necessary for the management device 120 in a time slot assigned to the management device 120 itself. Subsequently, the management device 120 sequentially communicates with communication relay devices 130 assigned to time slots in the order of the time slots. At this time, a signal transmitted from the management device 120 to each communication relay device 130 includes at least a request signal that requests a reply of operation status information of the provider device 110.

On the other hand, each communication relay device 130 changes to the active state at the time of a specific slot according to the communication schedule, and waits for a request signal from the management device 120. Based on the specific slot, the communication relay device 130 acquires operation status information from the provider device 110 connected to this communication relay device 130. When the communication relay device 130 receives the request signal, the communication relay device 130 returns the operation status information from the provider device 110 to the management device 120 as a reply to the request signal. The communication relay device 130 is also in the active state in the relay slot to perform a relay process between the management device 120 and its lower-layer communication relay device 130.

Each provider device 110 changes to the active state in accordance with the specific slot of the communication relay device 130 connected to this provider device 110, and transmits operation status information to the communication relay device 130. If a plurality of provider devices 110 are connected to one communication relay device 130, all the plurality of provider devices 110 are in the active state at least at the start time of a specific slot of this communication relay device 130. The plurality of provider devices 110 sequentially receive a request signal from the communication relay device 130, and transmits operation status information to the communication relay device 130. The plurality of provider devices 110 change to the sleep states in the order of completion of transmission of operation status information to the communication relay device 130.

In this manner, in basic processing of the collection process, in each specific slot, the management device 120 collects operation status information of the provider devices 110 corresponding to the specific slot according to the communication schedule to thereby collect operation status information of all the provider devices 110.

Here, as illustrated in FIG. 16, a case where the communication relay device 130 with the device ID "R100" and the provider device 110 with the device ID "R15" are added to the network architecture illustrated in FIG. 11 will be described.

In this case, the management device 120 determines a connection relationship among the management device 120, the communication relay devices 130, and the provider devices 110 as illustrated in FIG. 16, and updates the network architecture information and the sensor table. FIG. 32 shows updated network architecture information. The updated sensor table is not shown. In the updated network architecture information, the device ID "R100" is added in the upper column, and the device ID "R3" is added as a higher-layer communication terminal corresponding to "R100" is added in the lower column.

In addition, based on the network architecture information, the management device 120 creates a routing table. FIG. 33 shows an updated routing table of the communication relay device 130 with the device ID "R1". In the updated routing table, the device ID "R100" is added as a final transmission destination in the upper column, and the device ID "R3" as a one-hop preceding communication relay device 130 corresponding to the device ID "R100" is added in the lower column.

When the connection relationship is determined, the management device 120 assigns a time slot to the communication relay device 130 with the added device ID "R100" and updates the communication schedule. FIG. 34 shows the updated communication schedule. In the updated communication schedule, the device ID "R100" is added to the time slot represented by column L3 and row N2.

The management device 120 stores the network architecture information, the sensor table, the routing table, and the communication schedule (i.e., slot assignment information) in an HDD 120c.

When the assignment of the time slot is completed, the management device 120 notifies the communication relay devices 130 and the provider devices 110 of the updated information. Specifically, the management device 120 notifies all the communication relay devices 130, of the updated network architecture information. Based on the updated network architecture information, each of the communication relay devices 130 updates the routing table. The management device 120 notifies the added communication relay device 130 (i.e., the communication relay device 130 with the device ID "R100") of slot assignment information (the slot number of a specific slot and the slot number of a relay slot (only in the presence of the relay slot)) and sensor connection information. Based on the sensor table, the management device 120 notifies the added provider devices 110 (i.e., provider device 110 with the device ID "T15") of relay device connection information. With the addition of the communication relay device 130 and the provider device 110, the management device 120 notifies communication relay devices 130 and provider devices 110 whose slot assignment information, sensor connection information, or relay device connection information is changed or added of the updated information. For example, to the communication relay devices 130 with the device IDs "R1" and "R3", the communication relay device 130 with the device ID "R100" is added as a lower-layer communication relay device 130. Thus, the management device 120 notifies the communication relay devices 130 with the device IDs "R1" and "R3" of the slot number of a specific slot of the communication relay device 130 with the device ID "R100" as the slot number of a relay slot.

The foregoing process is similarly performed not only in the case where the communication relay device 130 is added but also in a case where the communication relay device 130 is deleted or a case where the communication relay devices 130 are not changed but the connection relationship is changed.

As described above, each communication relay device 130 performs communication according to the common communication schedule, and manages the time of the active state for the communication process and the relay process based on the time slots. Accordingly, even when the communication relay devices 130 are added or deleted or the connection relationship changes, by updating specific slots and relay slots of the communication relay devices 130, the communication process and the relay process can be easily achieved in the communication network.

In the manner described above, the management system 100 forms a communication network using a plurality of communication terminals. The plurality of communication terminals include a management device 120 (master unit) and a plurality of communication relay devices 130 connected to the management device 120 and constituting a communication network. The management device 120 and the plurality of communication relay devices 130 communicate with each other according to a communication schedule divided into a plurality of time slots. Each of the plurality of communication relay devices 130 is assigned with a specific slot (specific time slot) of the plurality of time slots. The management device 120 communicates, in the specific slot, with the communication relay device 130 corresponding to the specific slot according to the communication schedule. Each of the communication relay devices 130 includes a CPU 130a, a memory 130b, a wireless communication circuit 130h, a timer circuit 130i serving as a communication controller that switches a state between an active state and a sleep state with a smaller power consumption than that in the active state and communicates with at least the management device 120 or another communication relay device 130 in the active state. Each of the communication relay devices 130 also includes a CPU 130a, a memory 130b, and a timer circuit 130i serving as the slot determiner that determines arrival as a specific slot and arrival of a relay slot (relay time slot) that is a time slot assigned to a another lower-layer communication relay device 130. If the slot determiner determines arrival of the specific slot, the communication controller changes to the active state and performs a predetermined communication process. If the slot determiner determines arrival of the relay slot, the communication controller changes to the active state and performs a communication relay process between the lower-layer communication relay device 130 and the management device 120 or another higher-layer communication relay device 130.

In other words, each communication relay device 130 constitutes a communication network together with the management device 120 and other communication relay devices 130 (other communication terminals), and is assigned with a specific slot in a communication schedule divided into a plurality of time slots. Each communication relay device 130 includes the CPU 130a, the memory 130b, the wireless communication circuit 130h, and the timer circuit 130i serving as a communication controller that switches the state between the active state and the sleep state with a smaller power consumption than that in the active state and communicates with at least the management device 120 or another communication relay device 130 in the active state. Each communication relay device 130 also includes the CPU 130a, the memory 130b, and the timer circuit 130i serving as a slot determiner that determines arrival of the specific slot and arrival of a relay slot that is a time slot assigned to another lower-layer communication relay device 130. If the slot determiner determines arrival of the specific slot, the communication controller changes to the active state and performs a predetermined communication process. If the slot determiner determines arrival of the relay slot, the communication controller changes to the active state and performs a communication relay process between the lower-layer communication relay device 130 and the management device 120 or another higher-layer communication relay device 130.

With this configuration, basically, each communication relay device 130 switches between the active state and the sleep state and performs communication in the active state. The communication relay device 130 determines whether to change to the active state or not depending on whether the specific slot or the relay slot arrives or not. As described above, each communication relay device 130 can easily determine the time to change to the active state depending on the time slot. Thus, even with a change in the communication network, each communication relay device 130 can easily achieve a communication process and a relay process as long as it is known when the specific slot and the relay slot are allocated in the communication schedule.

The slot determiner determines arrival of the specific slot and arrival of the relay slot based on at least slot assignment information indicating when the specific slot and the relay slot are allocated in the communication schedule.

That is, since the communication relay devices 130 perform communication according to the common communication schedule, arrival of the specific slot and arrival of the relay slot can be easily determined as long as information concerning when the specific slot and the relay slot are allocated in the communication schedule is known.

In addition, the communication controller communicates with the provider device 110 that acquires predetermined information (information acquiring device) to acquire information, temporarily stores the acquired information, and transmits the stored information to the higher-layer communication relay device 130 in the specific slot.

That is, as described above, to enable the plurality of communication relay devices 130 to perform communication according to the common communication schedule, all the communication relay devices 130 need to be in synchronization with one another. On the other hand, since communication relay devices 130 temporarily store information from the provider devices 110, the provider devices 110 do not need to be in synchronization with all the communication relay devices 130 (of course, may be in synchronization with all the communication relay devices 130). Thus, a synchronous process in the management system 100 can be simplified. In addition, it is sufficient to complete communication only between the communication relay devices 130 and the provider devices 110, and it is basically sufficient for the management device 120 to perform communication in consideration only of the communication relay devices 130 (of course, may perform communication also in consideration of the provider devices 110). Thus, the process of the management device 120 can be simplified.

INDUSTRIAL APPLICABILITY

The technique disclosed here can be used for communication terminals and wireless communication systems.

What is claimed is:

1. A wireless communication system that forms a communication network using a plurality of communication terminals, wherein
the plurality of communication terminals include a master unit, a plurality of slave units connected to the master unit and constituting the communication network, and a plurality of information acquiring devices acquiring predetermined information and connected to the plurality of slave units,
the master unit and the plurality of slave units communicate with each other according to a communication schedule divided into a plurality of time slots,
each of the plurality of slave units is assigned with a specific time slot in the plurality of time slots,
the master unit communicates, in the specific time slot, with a slave unit of the plurality of slave units corresponding to the specific time slot according to the communication schedule,
in the specific time slot, the slave unit corresponding to the specific time slot acquires the predetermined information from at least one of the plurality of information acquiring devices and transmits the predetermined information to the master unit,
each of the plurality of slave units includes:
a communication controller that: switches a state between an active state and a sleep state with a smaller power consumption than that in the active state; communicates with at least the master unit, another slave unit, or the at least one of the plurality of information acquiring devices in the active state; and if the communication controller communicates with the at least one of the plurality of information acquiring devices, temporarily stores the predetermined information acquired from the at least one of the plurality of information acquiring devices and transmits the stored information to a higher-layer communication terminal in the specific time slot, and
a slot determiner that determines arrival of the specific time slot and arrival of a relay time slot, the relay time slot being a time slot assigned to another lower-layer slave unit,
the communication controller:
changes to the active state and performs a predetermined communication process if the slot determiner determines arrival of the specific time slot, and
changes to the active state and performs a communication relay process between the lower-layer slave unit and another higher-layer slave unit if the slot determiner determines arrival of the relay time slot, and each of the plurality of information acquiring devices:
- switches a state between an active state and a sleep state with a smaller power consumption than that in the active state,
- changes to the active state and transmits the predetermined information to the slave unit connected to the each of the plurality of information acquiring devices in accordance with the specific time slot of the slave unit, and
- changes to the sleep state after completion of transmission of the predetermined information to the slave unit and before the slave unit changes to the sleep state in the specific time slot of the slave unit.

* * * * *